United States Patent [19]

Gundlach et al.

[11] Patent Number: 5,254,159
[45] Date of Patent: Oct. 19, 1993

[54] INK COMPOSITIONS

[75] Inventors: Kurt B. Gundlach, Pittsford, N.Y.; Geoffrey A. R. Nobes, Kitchener; Marcel P. Breton, Mississauga, both of Canada; Richard L. Colt, Rochester, N.Y.

[73] Assignee: Xerox Corporation, Stamford, Conn.

[21] Appl. No.: 992,353

[22] Filed: Dec. 17, 1992

[51] Int. Cl.$^5$ .............................................. C09D 11/02
[52] U.S. Cl. ............................ 106/22 H; 106/22 K; 106/22 R
[58] Field of Search .................... 106/22 H, 22 K, 22 R, 106/20 D

[56] References Cited

U.S. PATENT DOCUMENTS

| | | | |
|---|---|---|---|
| 4,155,768 | 5/1979 | Adams et al. | 106/22 H |
| 4,197,135 | 4/1990 | Bailey et al. | 101/22 H |
| 5,098,475 | 3/1992 | Winnick et al. | 106/22 R |
| 5,100,470 | 3/1992 | Hindagolla et al. | 106/22 R |
| 5,108,503 | 4/1992 | Hindagolla et al. | 106/22 R |
| 5,120,361 | 6/1992 | Winnik et al. | 106/22 R |

Primary Examiner—Helene Klemanski
Attorney, Agent, or Firm—Judith L. Byorick

[57] ABSTRACT

Disclosed is an ink composition which comprises water, an anionic dye, and a compound selected from the group consisting of N,N'-bis(3-aminopropyl)-1,2-ethylenediamine, 1,4-bis(3-aminopropyl)piperazine, N,N'-bis(3-aminopropyl)-1,3-propanediamine, N,N'-bis(2-amionethyl)-1,3-propanediamine, N,N'-bis(3-aminopropyl)-1,4-butanediamine, ethylenediamine, diethylenetriamine, triethylenetetramine, tetraethylenepentamine, nitrilotrisethylamine, N,N'-(diaminoethyl)piperazine, piperazinylethylethylenediamine, aminoethyltriethylenetetramine, aminoethylpiperazinylethylethylenediamine, piperazinylethyldiethylenetriamine, pentaethylene hexamine and mixtures thereof, said ink composition having a pH of more than about 8 and less than about 9. Further disclosed is an ink composition comprises water, a dye, a polyamine compound, and a monoamine compound of the general formula

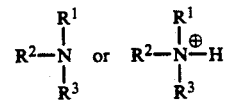

wherein $R^1$, $R^2$, and $R^3$ are independently selected from the group consisting of hydrogen, alkyl, and substituted alkyl. In one embodiment, the polyamine compound is a first generation dendrimer compound having terminal primary amine groups.

35 Claims, No Drawings

INK COMPOSITIONS

BACKGROUND OF THE INVENTION

The present invention is directed to ink compositions. More specifically, the present invention is directed to ink compositions particularly suitably for thermal ink jet printing. One embodiment of the present invention is directed to an ink composition which comprises water, a dye, and a compound selected from the group consisting of N,N'-bis(3-aminopropyl)-1,2-ethylenediamine, 1,4-bis(3-aminopropyl)piperazine, N,N'-bis(3-aminopropyl)-1,3-propanediamine, N,N'-bis(2-aminoethyl)-1,3-propanediamine, N,N'-bis(3-aminopropyl)-1,4-butanediamine, ethylenediamine, diethylenetriamine, triethylenetetramine, tetraethylenepentamine, nitrilotrisethylamine, N,N'-(diaminoethyl)piperazine, piperazinylethylethylenediamine, aminoethyltriethylenetetramine, aminoethylpiperazinylethylethylenediamine, pentaethylene hexamine, piperazinylethyldiethylenetriamine, and mixtures thereof, said ink composition having a pH of more than about 8 and less than about 9. Another embodiment of the present invention is directed to an ink composition which comprises water, a dye, a polyamine compound, and a monoamine compound of the formula

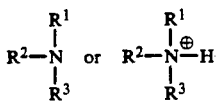

wherein $R^1$, $R^2$, and $R^3$ are independently selected from the group consisting of hydrogen, alkyl, and substituted alkyl. Yet another embodiment of the present invention is directed to an ink composition which comprises water, a dye, a first generation dendrimer compound having terminal primary amine groups, and a monoamine compound of the formula

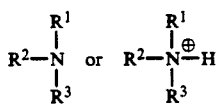

wherein $R^1$, $R^2$, and $R^3$ are independently selected from the group consisting of hydrogen, alkyl, and substituted alkyl. Ink compositions of the present invention exhibit improved waterfastness and other advantages as set forth herein.

Ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field which adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

Since drop-on-demand systems require no ink recovery, charging, or deflection, the system is much simpler than the continuous stream type. There are two types of drop-on-demand ink jet systems. One type of drop-on-demand system has as its major components an ink filled channel or passageway having a nozzle on one end and a piezoelectric transducer near the other end to produce pressure pulses. The relatively large size of the transducer prevents close spacing of the nozzles, and physical limitations of the transducer result in low ink drop velocity. Low drop velocity seriously diminishes tolerances for drop velocity variation and directionality, thus impacting the system's ability to produce high quality copies. Drop-on-demand systems which use piezoelectric devices to expel the droplets also suffer the disadvantage of a slow printing speed.

The other type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink in the immediate vicinity to evaporate almost instantaneously and create a bubble. The ink at the orifice is forced out as a propelled droplet as the bubble expands. When the hydrodynamic motion of the ink stops, the process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble formation or nucleation of around 280° C. Once nucleated, the bubble or water vapor thermally isolates the ink from the heater and no further heat can be applied to the ink. This bubble expands until all the heat stored in the ink in excess of the normal boiling point diffuses away or is used to convert liquid to vapor, which removes heat due to heat of vaporization. The expansion of the bubble forces a droplet of ink out of the nozzle, and once the excess heat is removed, the bubble collapses on the resistor. At this point, the resistor is no longer being heated because the current pulse has passed and, concurrently with the bubble collapse, the droplet is propelled at a high rate of speed in a direction towards a recording medium. The resistive layer encounters a severe cavitational force by the collapse of the bubble, which tends to erode it. Subsequently, the ink channel refills by capillary action. This entire bubble formation and collapse sequence occurs in about 10 microseconds. The channel can be refired after 100 to 500 microseconds minimum dwell time to enable the channel to be refilled and to enable the dynamic refilling factors to become somewhat dampened. Thermal ink jet processes are well known and are described in, for example, U.S. Pat. Nos. 4,601,777, 4,251,824, 4,410,899, 4,412,224, and 4,532,530, the disclosures of each of which are totally incorporated herein by reference.

Ink compositions for ink jet printing are known. For example, U.S. Pat. No. 4,155,768 (Adams et al.), the disclosure of which is totally incorporated herein by reference, discloses an ink for use in ink jet printers which contains a water soluble dye and a polyamine containing 6 or fewer nitrogen atoms per molecule, with the ink having a pH of 8 or below. The ink has improved waterfastness over an equivalent ink formulation without the polyamine additive.

U.S. Pat. No. 4,197,135 (Bailey et al.), the disclosure of which is totally incorporated herein by reference, discloses an ink for use in ink jet printers which contains a water soluble dye and a polyamine containing 7 or more nitrogen atoms per molecule, with the ink composition having a pH of 8 or above. The ink has improved waterfastness over an equivalent ink formation without the polyamine additive.

U.S. Pat. No. 5,100,470 (Hindagolla et al.), the disclosure of which is totally incorporated herein by reference, discloses an ink jet ink comprising a water soluble dye, water with or without a water soluble organic solvent, and sufficient polyalkylene polyamine to provide the ink with a pH of at least 9. About 2 to 10 percent urea may be added to the ink to reduce crusting of the ink.

U.S. Pat. No. 5,098,475 (Winnik et al.), the disclosure of which is totally incorporated herein by reference, discloses an ink composition comprising a solution with a dendrimer colored with a dye or dyes covalently attached thereto. As optional additives there may be included in the ink humectants and biocides. The inks can be prepared by mixing the appropriate components such as a dendrimer, water, and a reactive dye. Also disclosed is a process for the utilization of the aforementioned compositions and ink jet printing processes.

U.S. Pat. No. 5,120,361 (Winnik et al.), the disclosure of which is totally incorporated herein by reference, discloses an ink composition comprising a solution which comprises a dendrimer and a dye or dyes.

U.S. Pat. No. 5,108,503 (Hindagolla et al.) discloses inks for ink jet printing which have improved water resistance and smear resistance, containing from about 2.5 to about 25 percent by weight, preferably from about 7.5 to about 12.5 percent by weight of 2-pyrrolidone, N-(2-hydroxyethyl)-2-pyrrolidone, or mixtures thereof.

Although known compositions and processes are suitable for their intended purposes, a need remains for improved ink compositions suitable for use in thermal ink jet printing processes. In addition, there is a need for ink compositions for use in thermal ink jet printing processes which exhibit improved waterfastness. Further, a need remains for ink compositions suitable for generating waterfast images in thermal ink jet printing processes which are nontoxic and nonmutagenic.

SUMMARY OF THE INVENTION

It is an object of the present invention to provide improved ink compositions with the above noted advantages.

It is another object of the present invention to provide ink compositions suitable for use in thermal ink jet printing processes.

It is yet another object of the present invention to provide ink compositions for use in thermal ink jet printing processes which exhibit improved waterfastness.

It is still another object of the present invention to provide ink compositions suitable for generating waterfast images in thermal ink jet printing processes which are nontoxic and nonmutagenic.

These and other objects of the present invention (or specific embodiments thereof) can be achieved by providing an ink composition which comprises water, a dye, and a compound selected from the group consisting of N,N'-bis(3-aminopropyl)-1,2-ethylenediamine, 1,4-bis(3-aminopropyl)piperazine, N,N'-bis(3-aminopropyl)-1,3-propanediamine, N,N'-bis(2-aminoethyl)-1,3-propanediamine, N,N'-bis(3-aminopropyl)-1,4-butanediamine, ethylenediamine, diethylenetriamine, triethylenetetramine, tetraethylenepentamine, nitrilotrisethylamine, N,N'-(diaminoethyl)piperazine, piperazinylethylethylenediamine, aminoethyltriethylenetetramine, aminoethylpiperazinylethylenediamine, pentaethylene hexamine, piperazinylethyldiethylenetriamine, and mixtures thereof, said ink composition having a pH of more than about 8 and less than about 9. Another embodiment of the present invention is directed to an ink composition which comprises water, a dye, a polyamine compound, and a monoamine compound of the formula

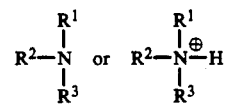

wherein $R^1$, $R^2$, and $R^3$ are independently selected from the group consisting of hydrogen, alkyl, and substituted alkyl. Yet another embodiment of the present invention is directed to an ink composition which comprises water, a dye, a first generation dendrimer compound having terminal primary amine groups, and a monoamine compound of the formula

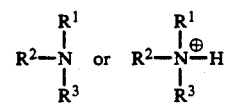

wherein $R^1$, $R^2$, and $R^3$ are independently selected from the group consisting of hydrogen, alkyl, and substituted alkyl. Another embodiment of the present invention is directed to a printing process which comprises (1) incorporating into an ink jet printing apparatus an ink composition of the present invention, and (2) causing droplets of the ink to be ejected in an imagewise pattern onto a substrate, thereby generating images on the substrate. In a particularly preferred embodiment, the printing apparatus employs a thermal ink jet process, wherein the droplets of ink are caused to be ejected by heating the ink and causing bubbles to form therein.

DETAILED DESCRIPTION OF THE INVENTION

The liquid vehicle of the inks of the present invention may consist of water, or it may comprise a mixture of water and a miscible organic component, such as ethylene glycol, propylene glycol, diethylene glycols, glycerine, dipropylene glycols, polyethylene glycols, polypropylene glycols, amides, such as urea and substituted ureas, ethers, carboxylic acids, esters, alcohols, organosulfides, organosulfoxides, sulfones, alcohol derivatives, carbitol, butyl carbitol, cellusolve, ether derivatives, amino alcohols, ketones, N-methylpyrrolidinone, 2-pyrrolidinone, cyclohexylpyrrolidone, hydroxyethers, amides, sulfoxides, lactones, and other water miscible materials, as well as mixtures thereof. When mixtures of water and water miscible organic liquids are selected as the liquid vehicle, the water to organic ratio may be in any effective range, and typically is from about 100:0 to about 30:70, preferably from about 97:3 to about 50:50, although the ratio can be outside this range. The non-water component of the liquid vehicle generally serves as a humectant which has a boiling point higher than that of water (100° C.). In the inks of the present invention, the liquid vehicle (comprising water plus humectant) is generally present in an amount of from about 60 to about 99.5 percent by weight, and preferably from about 75 to about 99 percent by weight, although the amount can be outside of this range. In a particularly preferred embodiment of the present invention, the liquid vehicle comprises a mixture of water, 2-purrolidinone or N-methyl pyrrolidinone, and sulfolane, of the formula

In ink compositions containing sulfolane to stabilize the ink components and the polyamines of the present invention, the presence of 2-pyrrolidinone or N-methyl pyrrolidinone, preferably in an amount of from about 1 to about 15 percent by weight, enhances the recoverability of the ink print cartridge to fire ink drops after the printer has been idle (and uncapped) for extended periods of time. Preferably, the liquid vehicle comprises water in an amount of from about 80 to about 90 parts by weight, sulfolane in an amount of from about 5 to about 10 parts by weight, and 2-pyrrolidinone or N-methyl pyrrolidinone in an amount of from about 1 to about 10 parts by weight, although the relative amounts can be outside this range.

In another preferred embodiment of the present invention, the liquid vehicle comprises a mixture of water and one or more ureas of the general formula

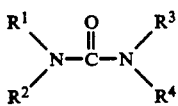

wherein $R^1$, $R^2$, $R^3$, and $R^4$ are independently selected from the group consisting of hydrogen and alkyl groups, such as methyl, ethyl, or the like. In this embodiment, the ink exhibits advantages similar to those obtained with a liquid vehicle comprising a mixture of water, sulfolane, and a pyrrolidone. The urea component is present in any effective amount, typically from about 10 to about 40 percent by weight of the ink, and more preferably from about 15 to about 25 percent by weight of the ink, although the amount can be outside these ranges. In addition, the liquid vehicle can comprise a mixture of water, one or more ureas, and a glycol, such as ethylene glycol, diethylene glycol, dipropylene glycol, or the like. In this embodiment, which also exhibits advantages similar to those obtained with a liquid vehicle comprising a mixture of water, sulfolane, and a pyrrolidone, the presence of the glycol enables an ink containing a smaller relative concentration of the urea or ureas without precipitation of a dye/polyamine complex than would generally be possible for inks containing one or more ureas but no glycol in the liquid vehicle.

Inks of the present invention contain a colorant. Generally, the colorant is a dye, preferably an anionic dye. Any suitable anionic dye may be employed, with the term "anionic dye" referring to a dye wherein the molecular structure of the chromophore contains at least one anionic site. Examples of suitable anionic dyes include reactive dyes and direct dyes. Specific examples include Bernacid Red 2BMN, Pontamine Brilliant Bond Blue A, BASF X-34, Pontamine, Food Black 2, Carodirect Turquoise FBL Supra Conc. (Direct Blue 199), available from Carolina Color and Chemical, Special Fast Turquoise 8GL Liquid (Direct Blue 86), available from Mobay Chemical, Intrabond Liquid Turquoise GLL (Direct Blue 86), available from Crompton and Knowles, Cibracron Brilliant Red 38-A (Reactive Red 4), available from Aldrich Chemical, Drimarene Brillant Red X-2B (Reactive Red 56); available from Pylam, Inc., Levafix Brilliant Red E-4B, available from Mobay Chemical, Levafix Brilliant Red E-6BA, available from Mobay Chemical, Procion Red H8B (Reactive Red 31), available from ICI America, Pylam Certified D&C Red #28 (Acid Red 92), available from Pylam, Direct Brill Pink B Ground Crude, available from Crompton & Knowles, Cartasol Yellow GTF Presscake, available from Sandoz, Inc., Tartrazine Extra Conc. (FD&C Yellow #5, Acid Yellow 23), available from Sandoz, Carodirect Yellow RL (Direct Yellow 86), available from Carolina Color and Chemical Cartasol Yellow GTF Liquid Special 110, available from Sandoz, Inc., D&C Yellow #10 (Acid Yellow 3), available from Tricon, Yellow Shade 16948, available from Tricon, Basacid Black X34, available from BASF, Basacid Black 738, available from BASF, Carta Black 2GT, available from Sandoz, Inc., Neozapon Red 492 (BASF), Orasol Red G (Ciba-Geigy), Direct Brilliant Pink B (Crompton-Knolls), Aizen Spilon Red C-BH (Hodagaya Chemical Company), Kayanol Red 3BL (Nippon Kayaku Company), Levanol Brilliant Red 3BW (Mobay Chemical Company), Levaderm Lemon Yellow (Mobay Chemical Company), Spirit Fast Yellow 3G, Aizen Spilon Yellow C-GNH (Hodagaya Chemical Company), Sirius Supra Yellow GD 167, Cartasol Brilliant Yellow 4GF (Sandoz), Pergasol Yellow CGP (Ciba-Geigy), Orasol Black RL (Ciba-Geigy), Orasol Black RLP (Ciba-Geigy), Savinyl Black RLS (Sandoz), Dermacarbon 2GT (Sandoz), Pyrazol Black BG (ICI), Morfast Black Conc A (Morton-Thiokol), Diazol Black RN Quad (ICI), Orasol Blue GN (Ciba-Geigy), Savinyl Blue GLS (Sandoz), Luxol Blue MBSN (Morton-Thiokol), Sevron Blue 5GMF (ICI), Basacid Blue 750 (BASF), Levafix Brilliant Yellow E-GA, Levafix Yellow E2RA, Levafix Black EB, Levafix Black E-2G, Levafix Black P-36A, Levafix Black PN-L, Levafix Brilliant Red E6BA, and Levafix Brillant Blue EFFA, available from Bayer, Procion Turquoise PA, Procion Turquoise HA, Procion Turquoise H-5G, Procion Turquoise H-7G, Procion Red MX-5B, Procion REd MX 8B GNS, Procion Red G, Procion Yellow MX-4G, Procion Black H-EXL, Procion Black P-N, Procion Blue MX-R, Procion Blue MX-4GD, Procion Blue MX-G, and Procion Blue MX-2GN, available from ICI, Cibacron Red F-B, Civacron Black BG, Lanasol Black B, Lanasol Red 5B, Lanasol Red B, and Lanasol Yellow 4G, available from Ciba-Geigy, Basilen Black P-BR, Basilen Yellow EG, Basilen Brilliant Yellow P-3GN, Basilen Yellow M-6GD, Basilen Brilliant Red P-3B, Basilen Scarlet E-2G, Basilen Red E-B, Basilen Red E-7B, Basilen Red M-5B, Basilen Blue E-R, Basilen Brillant Blue P-3R, Basilen Black P-BR, Basilen Turquoise Blue P-GR, Basilen Turquoise M-2G, Basilen Turquoise E-G, and Basilen Green E-6B, available from BASF, Sumifix Turquoise Blue G, Sumifix Turquoise Blue H-GF, Sumifix Black B, Sumifix Black H-BG, Sumifix Yellow 2GC, Sumifix Supra Scarlet 2GF, and Sumifix Brilliant Red 5BF, available from Sumitomo Chemical Company, Intracron Yellow C-8G, Intracron Red C-8B, Intracron Turquoise Blue GE, INtracron Turquoise HA, and Intracron Black RL, available from Crompton and Knowles, Dyes and Chemicals Division, and the like. Particularly preferred are dyes available from ICI Americas, Inc. of the chemical structure

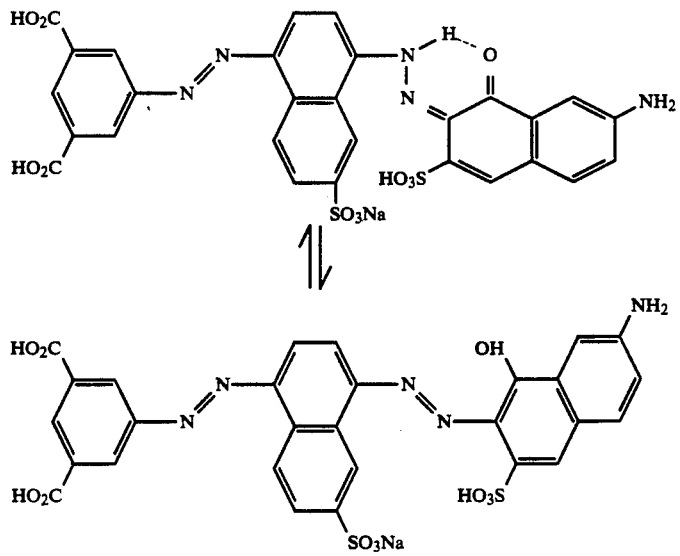

and those of the chemical structure

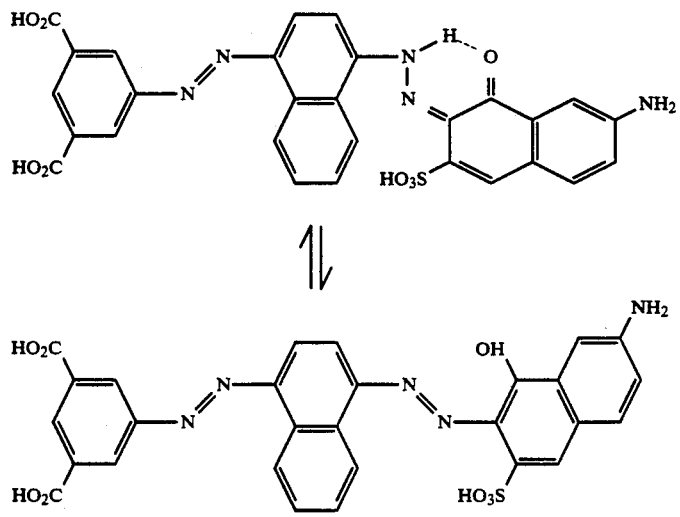

Dyes that are invisible to the naked eye but detectable when exposed to radiation outside the visible wavelength range (such as ultraviolet or infrared radiation), such as dansyl-lysine, N-(2-aminoethyl)-4-amino-3,6-disulfo-1,8-dinaphthalimide dipotassium salt, N-(2-aminopentyl)-4-amino-3,6-disulfo-1,8-dinaphthalamide dipotassium salt, Cascade Blue ethylenediamine trisodium salt (available from Molecular Proes, Inc.), Cascade Blue cadaverine trisodium salt (available from Molecular Proes, Inc.), bisdiazinyl derivatives of 4,4'-diaminostilbene-2,2'-disulfonic acid, amide derivatives of 4,4'-diaminostilbene-2,2'-disulfonic acid, phenylurea derivatives of 4,4'-disubstituted stilbene-2,2'-disulfonic acid, mono- or di-naphthyltriazole derivatives of 4,4'-disubstituted stilbene disulfonic acid, derivatives of benzithiazole, derivatives of benzoxazole, derivatives of benziminazole, derivatives of coumarin, derivatives of pyrazolines containing sulfonic acid groups, 4,4'-bis(-triazin-2-ylamino)stilbene-2,2'-disulfonic acids, 2-(stilben-4-yl)naphthotriazoles, 2-(4-phenylstilben-4-yl)benzoxazoles, 4,4-bis(triazo-2-yl)stilbene-2,2'-disulfonic acids, 1,4-bis(styrl)biphenyls, 1,3-diphenyl-2-2-pyrazolines, bis(benzazol-2-yl) derivatives, 3-phenyl-7-(triazin-2-yl)coumarins, carbostyrils, naphthalimides, 3,7-diaminodibenzothiophen-2,8-disulfonic acid-5,5-dioxide, other commerically available materials, such as C.I. Fluoroscent Brightener No. 28 (C.I. 40622), the fluorescent series Leucophor B-302, BMB (C.I. 290), BCR, BS, and the like (available from Leucophor), and the like, are also suitable. The anionic dye is present in the ink composition in any effective amount, typically from about 1 to about 20 percent by weight, and preferably from about 2 to about 10 percent by weight (wherein the amount refers to the amount of dye molecules present in the ink), although the amount can be outside of this range. A mixture of dyes in the proportions desired to obtain a specific shade may also be employed.

The ink compositions of the present invention also include an additive selected from the group consisting of N,N'-bis(3-aminopropyl)-1,2-ethylenediamine, 1,4-bis(3-aminopropyl)piperazine, N,N'-bis(3-aminopropyl)-1,3-propanediamine, N,N'-bis(2-aminoethyl)-1,3-propanediamine, N,N'-bis(3-aminopropyl)-1,4-butanediamine (common name spermine), and mixtures thereof. N,N'-bis(3-aminopropyl) ethylenediamine is of the formula

and is available from commerical sources, such as Aldrich Chemical Company, Milwaukee, Wis., or Fluka Chemical Corporation, Ronkonkoma, N.Y. 1,4-bis(3-aminopropyl)piperazine is of the formula

and is available from commerical sources, such as Aldrich Chemical Company, Milwaukee, Wis. N,N'-bis(3-aminopropyl)-1,3-propanediamine is of the formula

and is available from commercial sources, such as Aldrich Chemical Company, Milwaukee, Wis. N,N'-bis(2-aminoethyl)-1,3-propanediamine is of the formula

and is available from commerical sources, such as Aldrich Chemical Company, Milwaukee, Wis. N,N'-bis(3-aminopropyl)-1,4-butanediamine (common name spermine) is of the formula

and is available from commercial sources, such as Aldrich Chemical Company, Milwaukee, Wis. The total amount of N,N'-bis(3-aminopropyl) ethylenediamine, 1,4-bis(3-aminopropyl) piperazine, N,N'-bis(3-aminopropyl)-1,3-propanediamine, N,N'-bis(2-aminoethyl)-1,3-propanediamine, N,N'-bis(3-aminopropyl)-1,4-butanediamine, or mixture thereof can be any effective amount; typically, this amount is from about 0.05 to about 5 percent by weight of the ink composition, preferably from about 0.2 to about 3 percent by weight of the ink composition, and more preferably from about 0.4 to about 2.0 percent by weight, although the amount can be outside of these ranges.

In another embodiment of the present invention, other suitable polyamines include ethylenediamine, of the formula

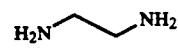

diethylenetriamine, of the formula

triethylenetetramine, of the formula

tetraethylenepentamine, of the formula

nitrilotrisethylamine, of the formula

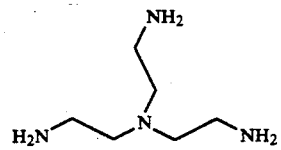

N,N'-(diaminoethyl)piperazine, of the formula

piperazinylethylethylenediamine, of the formula

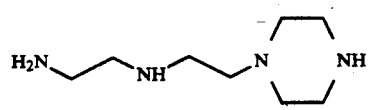

aminoethyltriethylenetetramine, of the formula

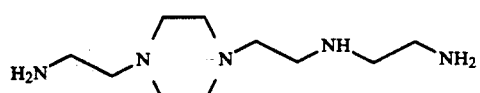

piperazinylethyldiethylenetriamine, of the formula

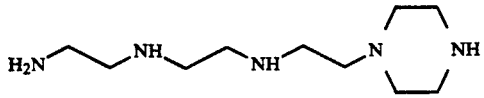

pentaethylenehexamine, of the formula

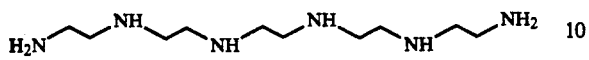

and mixtures thereof. Polyamines of these formulae are commerically available as, for example, TEXLIN 300 (triethylenetetramine), TEXLIN 400 (tetraethylenepentamine), and TEXLIN 500 (polyethylenepolyamine, molecular weight 232.4, believed to contain pentaethylenehexamine) from Texaco, Inc., Houston, Tex., and are also available from from Aldrich Chemical Co., Milwaukee, Wis., and from Bayer (Canada) Inc., Point Claire, PQ. These polyamines typically are present in an amount of from about 0.001 to about 3 percent by weight, preferably from about 0.01 to about 1.5 percent by weight, although the amount can be outside these ranges. In this particular embodiment of the invention, a preferred ink component is tetramethylene sulfone (also called sulfolane), preferably present in an amount of from about 8 to about 20 percent by weight of the ink, and more preferably from about 9 to about 15 percent by weight of the ink, although the amount can be outside these ranges.

The ink compositions of the present invention typically have a pH of from about 6.5 to about 10.5, preferably from about 7 to less than about 10.0, more preferably from about 7 to less than about 9.0, and more preferably from about 8 to about 8.5. Preferably, the buffer is either a weak base, such as a tertiary amine such as triethanolamine or trimethanolamine or tris(hydroxymethyl) aminomethane (TRIS) with a strong acid such as hydrochloric, sulfuric, phosphoric, or polyphosphoric, or a weak base with a weak acid such as boric or acetic. The weak base typically is present in a 1 to 20 molar excess relative to the molarity of the dye molecules present in the ink. Generally, the ink is prepared with the polyamine additive and the weak base buffer aid, both of which are basic, followed by the addition of the acid to drop the pH to the desired level. One specific preferred embodiment of the present invention is directed to an ink composition comprising from about 0.3 to about 1.0 percent by weight N,N'-bis (3-aminopropyl)-1,2-ethylenediamine buffered as described above to a pH of from about 8.05 to about 8.45.

A preferred embodiment of the present invention is directed to an ink composition comprising water, an anionic dye, a polyamine compound, and a monoamine compound. Any polyamine compound may be used, including N,N'-bis (3-aminopropyl)-1,2-ethylenediamine, 1,4-bis (3-aminopropyl) piperazine, N,N'-bis(3-aminopropyl)-1,3-propanediamine, N,N'-bis(2-aminoethyl)-1,3-propanediamine, N,N'-bis(3-aminopropyl)-1,4-butanediamine, or mixtures thereof, as well as polyamines as disclosed in, for example, U.S. Pat. No. 4,155,768, U.S. Pat. No. 4,197,135, and U.S. Pat. No. 5,100,470, the disclosures of each of which are totally incorporated herein by reference. In this embodiment, the polyamine is present in any effective amount, typically from about 0.05 to about 5 percent by weight of the ink composition, preferably from about 0.2 to about 3 percent by weight of the ink composition, and more preferably from about 0.4 to about 2.0 percent by weight, although the amount can be outside of these ranges.

The monoamine compound may be a primary amine, a secondary amine, or a tertiary amine. In general, any compound of the general formula

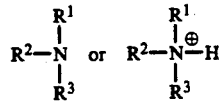

wherein $R^1$, $R^2$, and $R^3$ are independently selected from the group consisting of hydrogen, alkyl (preferably with from 1 to about 10 carbon atoms), and substituted alkyl groups (preferably with from 1 to about 10 carbon atoms) (with examples of suitable substituents on the alkyl groups including carboxylic acid, sulfonic acid, phosphonic acid, alcohol, ether, siloxy, and the like), is suitable for this embodiment of the invention. Specific examples of suitable monoamine compounds include ammonia, ammonium salts, methylamine, diethylamine, triethylamine, tris(hydroxymethyl) aminomethane (TRIS), tris[2-(2-methoxyethoxy)ethyl]amine (TDA-1), taurine, 2-aminoethylphosphonic acid, 4-aminobutyric acid, 3-aminopropyl triethoxysilane, 2-aminoethylthiol, ethanolamine, triethanolamine, and the like, as well as mixtures thereof.

The monoamine compound is present in any effective amount. Typically, the monoamine is present in an amount relative to the dye such that the molar ratio of dye to monoamine is 1 mole equivalent of dye molecules to from about 2 to about 10 mole equivalents of the monoamine molecules. Typically, the polyamine compound is present in an amount relative to the dye such that the molar ratio of dye to polyamine is 1 mole equivalent of dye molecules to from about 0.3 to about 4.5 mole equivalents of polyamine molecules. Typically, the molar ratio of monoamine molecules to polyamine molecules is from about 1 mole equivalent of monoamine molecules to from about 0.033 to about 2 mole equivalents of polyamine molecules. Typically, the monoamine is present in an amount of from about 0.05 to about 5 percent by weight of the ink. The relative amounts of these compounds, however, can be outside these ranges.

Ink compositions containing the monoamine compound exhibit particularly desirable waterfastness characteristics. In some embodiments, waterfastness values of from about 70 to about 99 percent or more have been obtained with these inks. The monoamine compound can also function as the weak base portion of a buffer system if desired.

Another embodiment of the present invention is directed to an ink composition comprising water, an anionic dye, a monoamine compound, and a first generation dendrimer compound having terminal primary amine groups. The monoamine compound in this embodiment is as described herein for the embodiment containing the polyamine and the monoamine. Dendrimers are known, and can be considered radially symmetrical molecules of a starburst topology comprising an initiator core, such as nitrogen, ethylenediamine, and the like, interior layers attached to the core and comprising, for example, three or four arms, each arm being composed of repeating units, with the number of repeating units in each arm being considered the generation of the dendrimer, and terminal functional groups functionality, such as a primary amine attached to the outermost generation. Dendrimers are illustrated in, for example, U.S. Pat. Nos. 5,120,361, 4,507,466, 4,631,337, 4,558,120, 4,568,737, 4,587,329, and D. A. Tomalia, A. M. Naylor, and W. A. Goddard III, *Angewandte Chemie*, Int. Ed. Engl. 29, 138 (1990), the disclosures of each of which are totally incorporated herein by reference. The size and shape of the starburst dendrimer molecule and the functional groups present in the dendrimer molecule can be controlled by the choice of the initiator core, the number of generations, and the choice of repeating units employed at each generation. The choice of the dendrimer components can affect the properties of the dendrimers. The initiator core type can affect the dendrimer shape, producing, for example, spheroid-shaped dendrimers, cylindrical- or rod-shaped dendrimers, or ellipsoid-shaped dendrimers. Sequential building of generations determines the dimensions of the dendrimers and the nature of its interior. Examples of suitable core materials include ammonia, polyfunctional alcohols, such as pentaerythritol or tris-(hydroxymethyl)ethane, 1,1,1-tris-(4'-hydroxyphenyl)-ethane, polyfunctional amines, such as ethylene diamine, linear polyethyleneimines, and the like. The chemical functionality of the repeating unit in the interior layers can include, for example, amidoamines, such as amino-ethyl acetamide, imines, such as diethylene diimine, or ethers such as those obtained from materials such as 3,5-dihydroxyethyl benzyl alcohol. The terminal functionalities include, for example, amino groups, hydroxyl groups, carboxylic acid groups, carboxylates, esters, amides, phosphates, sulfonates, and the like. The synthesis of dendrimers usually occurs by a divergent approach that involves the initial reaction of a monomer with the initiator core, followed by exhaustive reaction of the resulting functional groups with a difunctional compound, such as a diamine, including, for example, ethylene diamine, to afford the next generation of reactive amino groups. Repetition of the two-step procedure leads to subsequent generations. An alternate synthetic route uses a convergent growth synthesis as described in detail in C. J. Hawker and J. M. J. Frechet, *J. Am. Chem. Soc.*, 112, 7638 (1990), the disclosure of which is totally incorporated herein by reference. Examples of dendrimers prepared by the divergent approach include the STARBURST ® available from Dow Chemical Company, Dendrimer Microparticles available from Polysciences, Inc., in which the terminal functional groups are primary amino groups, and which range in average diameter of from about 10.8 Angstroms (first generation) to about 83.9 Angstroms (8th generation). One specific example of a dendrimer molecule suitable for the inks of the present invention is a first generation dendrimer based on ethylenediamine, available as STARBURST ® First Generation 10 Angstrom from Polysciences Inc., Warrington, Pa., with the structural formula:

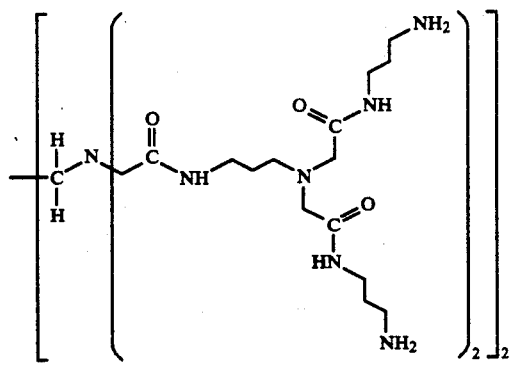

The dendrimer compound is present in the ink in any effective amount, typically from about 0.1 to about 10 percent by weight, and preferably from about 1 to about 5 percent by weight, although the amount can be outside this range. Typically, the monoamine is present in these inks an amount relative to the dye such that the molar ratio of dye to monoamine is 1 mole equivalent of dye molecules to from about 2 to about 10 mole equivalents of the monoamine molecules. Typically, the dendrimer compound is present in an amount relative to the dye such that the molar ratio of dye to dendrimer is 1 mole equivalent of dye molecules to from about 0.3 to about 4.5 mole equivalents of dendrimer molecules. Typically, the molar ratio of monoamine molecules to dendrimer molecules is from about 1 mole equivalent of monoamine molecules to from about 0.033 to about 2 mole equivalents of dendrimer molecules. The relative amounts of these compounds, however, can be outside these ranges.

Other additives can also be present in the inks of the present invention. For example, one or more surfactants or wetting agents can be added to the ink. These additives may be of the cationic, anionic, or nonionic types. Suitable surfactants and wetting agents include sodium lauryl sulfate, Tamol ® SN, Tamol ® LG, those of the Triton ® series available from Rohm and Haas Company, those of the Marasperse ® series, those of the Igepal ® series available from GAF Company, those of the Tergitol ® series, and other commercially available surfactants. These surfactants and wetting agents are present in effective amounts, generally from 0 to about 15 percent by weight, and preferably from about 0.01 to about 8 percent by weight, although the amount can be outside of this range.

Polymeric additives can also be added to the inks of the present invention to enhance the viscosity of the ink and the stability of the pigment particles and to reduce the rate of agglomeration and precipitation of the particles. Water soluble polymers such as Gum Arabic, polyacrylate salts, polymethacrylate salts, polyvinyl alcohols, hydroxy propylcellulose, hydroxyethylcellulose, polyvinylpyrrolidinone, polyvinylether, starch, polysaccharides, and the like are particularly useful for stabilizing pigment particles in a water based liquid vehicle such as water or a mixture of water and a water miscible organic liquid. Polymeric stabilizers may be present in the ink of the present invention in amounts of from 0 to about 10 percent by weight, and preferably from about 0.01 to about 5 percent by weight, although the amount can be outside of this range.

One preferred additive to the inks of the present invention is a polymeric additive consisting of two polyalkylene oxide chains bound to a central bisphenol-A moiety. This additive is of the formula

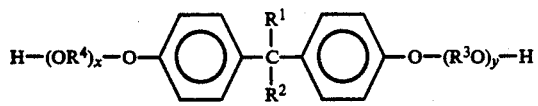

wherein $R^1$ and $R^2$ are independently selected from the group consisting of hydrogen, alkyl groups with from 1 to about 8 carbon atoms, such as methyl, ethyl, propyl, and the like, and alkoxy groups with from 1 to about 8 carbon atoms, such as methoxy, ethoxy, butoxy, and the like, $R^3$ and $R^4$ are independently selected from the group consisting of alkyl groups with from 1 to about 4 carbon atoms, and x and y are each independently a number of from about 100 to about 400, and preferably from about 100 to about 200. Generally, the molecular weight of the polyalkylene oxide/bisphenol-A polymer is from about 14,000 to about 22,000, and preferably from about 15,000 to about 20,000, although the molecular weight can be outside this range. Materials of this formula are commercially available; for example, Carbowax M20, a polyethylene oxide/bisphenol-A polymer of the above formula with a molecular weight of about 18,000, available from Union Carbide Corporation, Danbury, CT, is a suitable polymeric additive for the inks of the present invention. In addition, compounds of the above formula can be prepared by the methods disclosed in *Polyethers*, N. G. Gaylord, John Wiley & Sons, New York (1963) and "Laboratory Synthesis of Polyethylene Glycol Derivatives," J. M. Harris, *J. Molecular Science-Rev. Macromol. Chem. Phys.*, C25(3), 325–373 (1985), the disclosures of each of which are totally incorporated herein by reference. The polyalkylene oxide/bisphenol-A additive is generally present in the ink in an amount of at least about 1 part per million. Typically, the polyalkylene oxide/bisphenol-A additive is present in amounts of up to 1 percent by weight of the ink, and preferably in amounts of up to 0.5 percent by weight of the ink; larger amounts of the additive may increase the viscosity of the ink beyond the desired level, but larger amounts can be used in applications wherein increased ink viscosity is not a problem. Inks containing these additives are disclosed in copending application U.S. Ser. No. 07/738,021, entitled "Ink Compositions for Ink Jet Printing," with the named inventor William M. Schwarz, filed Jul. 30, 1991, the disclosure of which is totally incorporated herein by reference.

Other optional additives to the inks of the present invention include biocides such as Dowicil 150, 200, and 75, benzoate salts, sorbate salts, and the like, present in an amount of from about 0.0001 to about 4 percent by weight, and preferably from about 0.01 to about 2.0 percent by weight, pH controlling agents such as acids or, bases, phosphate salts, carboxylates salts, sulfite salts, amine salts, and the like, present in an amount of from 0 to about 1 percent by weight and preferably from about 0.01 to about 1 percent by weight, or the like.

The ink compositions of the present invention are generally of a viscosity suitable for use in thermal ink jet printing processes. Typically, the ink viscosity is no more than about 5 centipoise, and preferably is from about 1 to about 2.5 centipoise.

Ink compositions of the present invention can be prepared by any suitable process. Typically, the inks are prepared by simple mixing of the ingredients. One process entails mixing all of the ink ingredients together and filtering the mixture to obtain an ink. Inks of the present invention can be prepared by preparing a conventional ink composition according to any desired process, such as by mixing the ingredients, heating if desired, and filtering, followed by adding the ink additive of the present invention to the mixture and mixing at room temperature with moderate shaking until a homogeneous mixture is obtained, typically from about 5 to about 10 minutes. Alternatively, the ink additive of the present invention can be mixed with the other ink ingredients during the ink preparation process, which takes place according to any desired procedure, such as by mixing all the ingredients, heating if desired, and filtering. The ink pH is adjusted to the desired level at some time during the preparation process; typically, pH adjustment occurs subsequent to most of the other ink preparation steps by addition of an acid and a buffer, and preferably the pH adjustment occurs prior to filtration so that any solid precipitates generated by pH adjustment can be removed from the ink during the filtration step.

The present invention is also directed to a process which entails incorporating an ink composition of the present invention into an ink jet printing apparatus and causing droplets of the ink composition to be ejected in an imagewise pattern onto a substrate. In a particularly preferred embodiment, the printing apparatus employs a thermal ink jet process wherein the ink in the nozzles is selectively heated in an imagewise pattern, thereby causing droplets of the ink to be ejected in imagewise pattern. Any suitable substrate can be employed, including plain papers such as Xerox® 4024 papers, ruled notebook paper, bond paper, silica coated papers such as Sharp Company silica coated paper, JuJo paper, and the like, transparency materials, fabrics, textile products, plastic, polymeric films, inorganic substrates such as metals and wood, and the like. In a preferred embodiment, the process entails printing onto a porous or ink absorbent substrate, such as plain paper.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I

An ink composition was prepared as follows. In a bottle were mixed 61.19 grams of deionized water, 8.24 grams of a solution containing 97 percent by weight sulfolane and 3 percent by weight water (obtained from Phillips 66 Company), and 6.98 grams of N-methyl pyrrolidinone (obtained from BASF). The bottle was then placed on a roll mill for 5 minutes. Thereafter, 0.54 grams of N,N'-bis (3-aminopropyl) ethylenediamine (obtained from Aldrich Chemical Co.) was added to the bottle and the bottle was again placed on the roll mill for 5 minutes. Subsequently, 1.04 grams (5 mole equivalents) of ammonium chloride were added to the bottle and the bottle was again placed on the roll mill for 5 minutes. Thereafter, 11.56 grams (1 mole equivalent) of BASF X-34 dye were added to the bottle and the bottle was again placed on the roll mill for an additional 15 minutes. The pH of the ink was then measured at 8.65. Prints were made from this ink by hand coating the ink onto Courtland (8 V) and Hammermill (3 V) paper with a #8 wire-wound bar. Subsequently, the pH of the ink was dropped by adding 3 Molar hydrochloric acid (32 drops) until the pH was 8.14. The ink was roll milled for an additional 5 minutes and again prints were made by hand coating the ink onto Courtland (8 V) and Hammermill (3 V) paper with a #8 wire-wound bar. Thereafter, the pH of the ink was dropped by adding 3 Molar hydrochloric acid (25 drops) until the pH was 7.51. The ink was roll milled for an additional 5 minutes and again prints were made by hand coating the ink onto Courtland (8 V) and Hammermill (3 V) paper with a #8 wire-wound bar. Subsequently, the pH of the ink was dropped by adding 3 Molar hydrochloric acid (13 drops) until the pH was 6.97. The ink was roll milled for an additional 5 minutes and again prints were made by hand coating the ink onto Courtland (8 V) paper and Hammermill (3 V) paper with a #8 wire-wound bar.

The prints thus made were tested for waterfastness by first allowing the prints to dry for 1 hour and then soaking them in deionized water for a period of 5 minutes. The optical densities of the prints were measured before and after soaking in water to determine waterfastness. The waterfastness results (percent) were as follows:

| pH | Courtland (8V) optical density (before/after) | Courtland (8V) waterfastness | Hammermill (3V) optical density (before/after) | Hammermill (3V) waterfastness |
|---|---|---|---|---|
| 8.65 | 139/138 | 99 | 124/110 | 89 |
| 8.14 | 140/138 | 99 | 127/113 | 89 |
| 7.51 | 138/136 | 99 | 128/114 | 89 |
| 6.97 | 138/136 | 99 | 124/112 | 90 |

As the results indicate, the ink exhibited high waterfastness characteristics over a wide pH range. Particularly high waterfastness over a wide pH range was observed with the acid sized Courtland (8 V) paper.

EXAMPLE II

Inks of the following compositions were prepared by first mixing together the dye and deionized water in a bottle, placing the bottle on a roll mill for 5 minutes, thereafter adding to the bottle N-methyl pyrrolidinone (NMP, obtained from BASF) and a mixture containing 97 percent by weight sulfolane and 3 percent by weight water (obtained from Phillips 66 Company), replacing the bottle on the roll mill for 5 minutes, measuring the pH of the ink, subsequently adding to the ink N,N'-bis (3-aminopropyl) ethylenediamine (N-BAPED), adjusting the pH of the ink when necessary by adding 3 Normal hydrochloric acid, measuring the pH, thereafter adding to the ink either ammonium chloride or ammonium bromide (both obtained from Aldrich Chemical Co.), and, when necessary, again adjusting the pH by the addition of 3 Normal hydrochloric acid and/or methylamine (40 percent by weight aqueous solution, obtained from Aldrich Chemical Co.). The inks had the following contents:

| Ink | Dye | Water | Sulfolane Solution | NMP | N-BAPED | $NH_4Cl$ | $NH_4Br$ | methyl amine (drops) | HCl (drops) |
|---|---|---|---|---|---|---|---|---|---|
| 1 | 5.75 g | 7.17 g | 1.42 g | 1.14 g | 0.22 g | 0.16 g | — | 2 | 23 |
| 2 | 0.699 g | 14.82 g | 1.69 g | 1.40 g | 0.20 g | 0.2 g | — | 2 | — |
| 3 | 2.12 g | 13.45 g | 1.69 g | 1.42 g | 0.21 g | 0.19 g | — | — | 25 |
| 4 | 8.76 g | 6.77 g | 1.71 g | 1.38 g | 0.19 g | 0.20 g | — | — | 22 |
| 5 | 7.01 g | 8.41 g | 1.71 g | 1.40 g | 0.32 g | — | 0.40 g | 3 | 19 |
| 6 | 0.726 g | 14.6 g | 1.72 g | 1.43 g | 0.21 g | — | 0.41 g | — | 28 |
| 7 | 0.782 g | 13.15 g | 1.62 g | 1.41 g | 0.22 g | 0.21 g | — | — | 18 |

The dyes contained in the inks were as follows:

| Ink | Dye |
|---|---|
| 1 | Projet Cyan (10 percent dye solids) (ICI) |
| 2 | Duasyn Yellow (Hoechst) |
| 3 | Brilliant Violet (33 percent dye solids) (Mobay) |
| 4 | Mitsubishi Magenta (8 percent dye solids) (Mitsubishi) |
| 5 | Projet Magenta (C.I. Acid Red 249) (10 percent dye solids) (ICI) |
| 6 | Duasyn Red VP-346 (Hoechst) |
| 7 | Duasyn Brilliant Red F3B VP218 (Hoechst) |

Prints were made with inks 1 through 5 and 7 (a) prior to addition of N-BAPED, (b) subsequent to addition of N-BAPED but prior to addition of other additives, and (c) after all additives had been added. Prints were made with ink 6 subsequent to addition of all additives. Prints were made by hand coating the ink onto Courtland (8V) paper and Hammermill (3V) paper with a #8 wire-wound bar.

The prints thus made were tested for waterfastness by first allowing the prints to dry for 1 hour and then soaking them in deionized water for a period of five minutes. The optical densities of the prints were measured through a variety of different filters before and after soaking in water to determine waterfastness. The waterfastness results (percent) were as follows:

| | I | II | III | IV | V | VI | VII | VIII |
|---|---|---|---|---|---|---|---|---|
| 1(a) | 33 | 46 | 47 | 52 | 21 | 41 | 20 | 40 |
| 1(b) | 90 | 89 | 95 | 84 | 89 | 84 | 100 | 91 |
| 1(c) | 100 | 91 | 100 | 88 | 100 | 86 | 100 | 81 |
| 2(a) | 44 | 71 | 100 | 129 | 40 | 63 | 19 | 16 |
| 2(b) | 82 | 93 | 89 | 100 | 80 | 94 | 81 | 72 |
| 2(c) | 100 | 100 | 100 | 89 | 100 | 100 | 98 | 86 |
| 3(a) | 77 | 89 | 75 | 93 | 77 | 88 | 65 | 87 |
| 3(b) | 96 | 97 | 98 | 100 | 92 | 95 | 90 | 94 |
| 3(c) | 100 | 96 | 98 | 97 | 100 | 94 | 100 | 96 |
| 4(a) | 28 | 24 | 33 | 48 | 24 | 17 | 18 | 18 |
| 4(b) | 57 | 53 | 44 | 37 | 48 | 43 | 40 | 38 |
| 4(c) | 95 | 51 | 74 | 46 | 76 | 39 | 72 | 37 |
| 5(a) | 37 | 39 | 35 | 37 | 27 | 32 | 21 | 28 |
| 5(b) | 93 | 79 | 90 | 66 | 85 | 74 | 80 | 65 |
| 5(c) | 100 | 92 | 100 | 100 | 92 | 90 | 96 | 90 |
| 6 | 99 | — | 98 | — | 99 | — | 97 | — |
| 7(a) | 34 | 43 | 27 | 39 | 26 | 29 | 17 | 23 |
| 7(b) | 93 | 86 | 92 | 81 | 89 | 89 | 84 | 80 |

-continued

| | I | II | III | IV | V | VI | VII | VIII |
|---|---|---|---|---|---|---|---|---|
| 7(c) | 100 | 99 | 100 | 100 | 100 | 96 | 98 | 97 | wherein:
I = Courtland 4024DP (8V) felt side, visible spectrum filter
II = Hammermill Alkaline (3V) felt side, visible spectrum filter
III = Courtland 4024DP (8V0 felt side, cyan filter
IV = Hammermill Alkaline (3V) felt side, cyan filter
V = Courtland 4024DP (8V0 felt side, magenta filter
VI = Hammermill Alkaline (3V) felt side, magenta filter
VII = Courtland 4024DP (8V0 felt side, yellow filter
VIII = Hammermill Alkaline (3V) felt side, yellow filter These results demonstrate the improved waterfastness of inks containing N,N'-bis(3-aminopropyl)-1,2-ethylenediamine and various anionic dyes. In addition, an ink containing a combination of N,N'-bis(3-aminopropyl)-1,2-ethylenediamine and a monoamine further exhibited increased waterfastness.

EXAMPLE III

An ink composition was prepared by simple mixing of ingredients comprising 71.3 weight percent water, 10 percent by weight N-methyl pyrrolidinone (ACS grade, obtained from J. T. Baker, Phillipsburg, N.J.), and 11.5 percent by weight Basacid X-34 process black dye (33 weight percent solid content, obtained from BASF Wyandotte Corp., Holland, Mich.). This partially completed ink had a pH of 7.30 and was assessed for residual density waterfastness on Courtland 4024DP acid sized paper to be 55 percent. To this mixture was added 1.0 weight percent N,N'-bis(3-aminopropyl)-1,2-ethylenediamine (reagent grade, obtained from BASF Wyandotte Corp., Holland, Mich.). The ink composition at this stage of completion had a pH of 10.34 with a residual waterfastness on Courtland 4024DP of 80 percent. To this mixture was added 1.2 weight percent ammonium bromide (reagent grade, obtained from Aldrich Chemical Co., Milwaukee, Wis.). The ink composition at this stage of development had a pH=9.36 with a residual waterfastness on Courtland 4024DP of 95 percent. To this mixture was added 2.5 weight percent of 3 molar hydrobromic acid (reagent grade, obtained from Aldrich Chemical Co., Milwaukee, Wis.). The ink composition was precipitate free at this stage of completion, and had a pH of 8.96, with a residual waterfastness on Courtland 4024DP of 99 percent. To this ink was added an additional 2.5 weight percent of 3 molar hydrobromic acid, bringing the ink pH down to 8.47. A slight amount of precipitation was noted when the waterfastness was assessed on Courtland 4024DP paper at 99 percent. For all inks which were residual density waterfast tested at various stages of formulation, the technique was as follows: The ink was coated on the felt side of the specified paper using a #8 wire wound bar to simulate calculated solid area coverage ink deposition quantities by thermal ink jet devices. The coatings were allowed to dry at ambient room conditions for 1 hour prior to measuring visible reflected density with a standard densitometer. The coatings were then submerged in deionized water for 5 minutes with mild stirring. After drying completely at ambient conditions the visible density was remeasured. The post-soak to pre-soak density ratio was converted to a percentage.

EXAMPLE IV

An ink composition was prepared by simple mixing of ingredients comprising 70.4 percent by weight water, 8 percent by weight sulfolane (medical grade, obtained from Phillips 66 Company, Bartlesville, Okla.), 7 percent by weight 2-pyrrolidinone (reagent grade, GAF Chemicals Corp., Wayne, N.J.), 11.5 percent by weight Basacid X-34 process black dye (33 weight percent solid content, obtained from BASF Wyandotte Corp., Holland, Mich.), 0.4 percent by weight N,N'-bis(3-aminopropyl)-1,2-ethylenediamine (reagent grade, obtained from Aldrich Chemical Co., Milwaukee, Wis.), 1.7 percent by weight 1.5 Molar sulfuric acid (ACS grade, obtained from J. T. Baker, Phillipsburg, N.J.), 0.8 percent by weight ammonium bicarbonate (reagent grade, obtained from Aldrich Chemical Co., Milwaukee, Wis.), 0.1 percent by weight Dowicil 150 biocide (product grade, Dow Chemical Co., Midland, Mich.), and 0.05 percent by weight Carbowax M20 (a polyethyleneoxide/bisphenol-A polymer of the formula

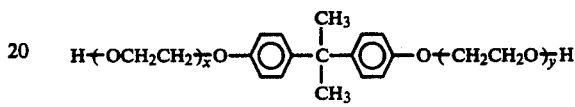

with a molecular weight of 18,000, obtained from Union Carbide Corporation, Danbury, Conn.). Subsequent to mixing, the ingredients were subjected to millipore filtration through a 0.2 micron polyester filter. The final ink had a pH=8.25, a surface tension of 54.5 dynes per centimeter, a conductivity of 11.6 millimohs per centimeter, a viscosity of 1.55 centipoise, and a residual density waterfastness on Xerox Courtland 4024DP88 paper of 90 percent. All results came from prints which were made by placing the final ink into an empty, clean Hewlett-Packard Deskjet-500 cartridge with subsequent placement of the cartridge into a Hewlett-Packard Deskjet-500 printer. The prints were allowed to sit at ambient room conditions for 24 hours prior to waterfastness assessment using tap water at approximately 70° F. The reflectance density in the visible region of a sample of the print which contained solid area coverage was initially measured three times. This portion of the print was submerged in the tap water for 5 minutes with mild stirring, allowed to air dry completely, and remeasured three times for optical density. The ratio of the post-soak density average to the pre-soak density average yielded a fraction which was converted to a percentage. The contrast density ratio was obtained by the making a print on the paper of study with a test pattern which resulted in a 1.25 square inch solid area with non-print area below it to the bottom of page, and allowing to sit for approximately 24 hours prior to the test. Thereafter, the print sample was placed on support board raised at a 45 degree angle. A pipette filled with tap water of pH between 6.8 and 7.2 units and between 70° and 75° F. was placed so that it was touching on the top right corner of the solid area square, and 1 milliliter of water was allowed to run evenly over the solid area over a ten second period of time, allowing the runoff to extend to the bottom of the print sample. The sample was allowed to dry untouched in a horizontal position. Subsequently, the density of the non printed paper was measured with a densitometer set with a visible filter in the pre-soaked solid area, the post-soaked solid area, the runoff area 3 millimeters below the solid area square, and the runoff area 12 millimeters below the solid area square. The contrast density ratio was calculated as follows:

$$CD = \frac{\left\{\left(\begin{bmatrix}\text{density} \\ \text{after} \\ \text{smear}\end{bmatrix} - \begin{bmatrix}\text{paper} \\ \text{density}\end{bmatrix}\right) - \frac{\left(\begin{bmatrix}\text{top} \\ \text{run off} \\ \text{density}\end{bmatrix} + \begin{bmatrix}\text{bottom} \\ \text{run off} \\ \text{density}\end{bmatrix}\right)}{2} - \left(\begin{matrix}\text{paper} \\ \text{density}\end{matrix}\right)\right\}}{\begin{bmatrix}\text{density of} \\ \text{nonsmeared} \\ \text{area}\end{bmatrix} - \begin{bmatrix}\text{paper} \\ \text{density}\end{bmatrix}} \times 100$$

wherein the density of nonsmeared area is the optical density of the solid area prior to exposure to the water streak, density after smear is the optical density of the water mark line in the center of the solid area patch after exposure to the water streak, top run off density is the optical density in the center of the smear line, 3 millimeters below the solid area patch, the bottom run off density is the optical density in the center of the smear line, 12 millimeters below the solid area patch, and the paper density is the optical density of unprinted areas on the paper surface. The contrast density ratio is often referred to as the smear density ratio

EXAMPLE V

An ink composition was prepared by simple mixing of ingredients comprising 72.4 percent by weight water, 8 percent by weight sulfolane (medical grade, obtained from Phillips 66 Company, Bartesville, Okla.), 7 percent by weight 2-pyrrolidinone (reagent grade, obtained from Aldrich Chemical Co., Milwaukee, Wis.), 10.4 percent by weight Basacid X-34 process black dye (33 weight percent solid content, obtained from BASF Wyandotte Corp., Holland, Mich.), 0.3 percent by weight N,N'-bis(3-aminopropyl)-1,2-ethylenediamine (reagent grade, obtained from Aldrich Chemical Co., Milwaukee, Wis.), 1.3 percent by weight 1.5 Molar sulfuric acid (ACS grade, obtained from J. T. Baker, Phillipsburg, N.J.), 0.4 weight percent ammonium bicarbonate (reagent grade, obtained from Aldrich Chemical Co., Milwaukee, Wis.), 0.1 weight percent Dowicil 150 biocide (product grade, Dow Chemical Co., Midland, Mich.), and 0.05 weight percent Carbowax M20 (a polyethyleneoxide/bisphenol-A polymer with a molecular weight of 18,000, obtained from Union Carbide Corporation, Danbury, Conn.). Subsequent to mixing, the ingredients were subjected to millipore filtration through a 0.2 micron polyester filter. The final ink had a pH=8.00, a surface tension of 50.3 dynes per centimeter, a conductivity of 7.27 millimohs per centimeter, a viscosity of 1.48 centipoise, and a residual density waterfastness on Xerox Courtland 4024DP88 paper of 85 percent.

EXAMPLE VI

An ink composition was prepared by simple mixing of ingredients comprising 72.7 percent by weight water, 8 percent by weight sulfolane (medical grade, obtained from Phillips 66 Company Bartlesville, Okla.), 7 percent by weight 2-pyrrolidinone (ACS grade, obtained from Aldrich Chemical Co., Milwaukee, Wis.), 0.3 percent by weight N,N'-bis(3-aminopropyl)-1,2-ethylenediamine (reagent grade, obtained from Aldrich Chemical Co., Milwaukee, Wis.), and 12 percent by weight Special Black Hf Sf (29 weight percent dye solids, obtained from Miles Incorporated, Pittsburgh, Pa.). Subsequent to mixing, the pH was adjusted by the addition of sulfuric acid to a pH of 8.47. The ink was precipitate free with a residual waterfastness on Courtland 4024DP of 80 percent.

EXAMPLE VII

An ink composition was prepared by simple mixing of ingredients comprising 76.7 weight percent water, 10 percent by weight diethyleneglycol (ACS grade, obtained from Aldrich Chemical Co., Milwaukee, Wis.) 0.75 percent by weight benzyl alcohol (ACS grade, obtained from Aldrich Chemical Co., Milwaukee, Wis.), 2.9 percent by weight Bayscript Black, Calif. 51071 (Food Black #2 salt free grade, obtained from Bayer-Miles Incorporated, Pittsburgh, Pa.), and 1.0 percent by weight N,N'-bis(3-aminopropyl)-1,2-ethylenediamine (reagent grade, obtained from Aldrich Chemical Co., Milwaukee, Wis.). Subsequent to mixing, the pH was adjusted by the addition of 5 weight percent 3 Molar hydrochloric acid to a Ph of 9.26. The ink at this stage of preparation was precipitate free with a residual waterfastness on Courtland 4024DP of 55 percent. To this ink was added 0.62 percent by weight ammonium chloride, resulting in a pH=8.98. The ink was precipitate free and assessed on Courtland 4024 DP paper felt side to have a residual waterfastness of 88 percent. The addition of 3 weight percent urea yielded a precipitate free ink of pH=8.86 with a residual waterfastness on Xerox Courtland 4024DP88 of 94 percent. The final ink was particularly resistant to dye plume with tap water and wet finger smear.

EXAMPLE VIII

An ink composition was prepared by simple mixing of ingredients comprising 70.4 percent by weight Project Black Liquid 1 (4.97 weight percent solid content, obtained from ICI, Wilmington, Del.), 8 percent by weight sulfolane (medical grade, obtained from Phillips 66 Company, Bartlesville, Okla.), 7 percent by weight 2-pyrrolidinone (ACS grade, obtained from Aldrich Chemical Co., Milwaukee, Wis.), 0.2 percent by weight N,N'-bis(3-aminopropyl)-1,2-ethylenediamine (reagent grade, obtained from Aldrich Chemical Co., Milwaukee, Wis.), 0.4 percent by weight ammonium bicarbonate (reagent grade, obtained from Aldrich Chemical Co., Milwaukee, Wis.), and 14 weight percent water. The ink's final pH was left unadjusted at 9.64 and the residual density waterfastness was 89 percent on Courtland 4024DP paper felt side.

EXAMPLE IX

An ink composition was prepared by simple mixing of ingredients comprising 80.5 percent by weight water, 8 percent by weight sulfolane (medical grade, obtained from Phillips 66, Company Bartlesville, Okla., 7 percent by weight 2-pyrrolidinone (ACS grade, obtained from Aldrich Chemical Co., Milwaukee, Wis.), and 2.5 percent by weight acidified and isolated dye mixture from the Hewett Packard Deskjet-500 ink (carboxylated analogs of Food Black 2, obtained from Hewett Packard, Corvallis, Oreg.). The addition of 1.0 percent by weight ammonium carbonate brought the pH up to 8.10 with dissolution of the dyes. The addition of 0.4 percent by weight N,N'-bis(3-aminopropyl)-1,2-ethylenediamine (reagent grade, obtained from Aldrich Chemical Co., Milwaukee, Wis.) brought the pH up to 8.92. The addition of 0.6 percent by weight of 1.5 Molar sulfuric acid (ACS grade, obtained from J. T. Baker, Phillipsburg, N.J.) brought the pH down to 7.99. The final ink was precipitate free with a residual waterfastness on Courtland 4024DP assessed at 98 percent. The final ink was completely resistant to dye plume with water.

EXAMPLE X

An ink composition was prepared by simple mixing of ingredients comprising 46 percent by weight water, 8 percent by weight sulfolane (medical grade, obtained from Phillips 66 Company, Bartlesville, Okla.), 7 percent by weight N-methyl pyrrolidinone (ACS grade, obtained from J. T. Baker, Phillipsburg, N.J.), and 28.8 percent by weight Projet Cyan Liquid 1 (10 weight percent solid content, obtained from ICI, Wilmington, Del.). The residual waterfastness on Courtland paper at this point in the ink preparation (pH=6.90, prior to the addition of waterfastness additives, measured with a cyan filter) was 47 percent. The addition of 1.1 percent by weight N,N'bis(3-aminopropyl)-1,2-ethylenediamine (reagent grade, obtained from Aldrich Chemical Co., Milwaukee, Wis.) brought the pH to 11.45. The pH was reduced to 8.97 by the addition of 7.6 weight percent 3 Molar hydrochloric acid (reagent grade, obtained from Aldrich Chemical Co., Milwaukee, Wis.) to yield a slight precipitation in the ink. The residual waterfastness on Courtland paper was 95 percent. The addition of 0.8 percent by weight ammonium chloride (ACS grade, obtained from Aldrich Chemical Co., Milwaukee, Wis.) dropped the pH to 8.52 without the redissolution of the precipitate. The addition of 0.6 weight percent methylamine (40 percent aqueous solution, obtained from Aldrich Chemical Co., Milwaukee, Wis.) rendered the ink precipitate free with a pH=8.85 and a residual waterfastness on Courtland 4024DP felt side of 100 percent with no evidence of dye plume.

EXAMPLE XI

An ink composition was prepared by simple mixing of ingredients comprising 3.5 percent by weight Duasyn Brilliant Yellow GL SF VP 220 (high purity solid, obtained from Hoechst, Coventry, R.I.), 80 percent by weight water, 8 percent by weight sulfolane (medical grade, obtained from Phillips 66 Company, Bartlesville, Okla.), and 7 percent by weight N-methylpyrrolidinone (ACS grade, obtained from J. T. Baker, Phillipsburg, N.J.), at which point the pH=5.43 and the residual waterfastness on Courtland paper was measured with a densitometer with a yellow filter at 19 percent. To this mixture was then added 1.0 percent by weight N,N'bis(3-aminopropyl)-1,2-ethylenediamine (reagent grade, obtained from Aldrich Chemical Co., Milwaukee, Wis.), which brought the pH to 10.85, at which point the residual density waterfastness was 81 percent. The addition of 1.0 percent by weight ammonium chloride resulted in immediate precipitation of the dye. To the non-homogeneous stirring mixture was added 0.6 percent by weight methylamine (40 percent aqueous solution, obtained from Aldrich Chemical Co., Milwaukee, Wis.), which rendered the ink precipitate free with a pH=9.43 and a residual waterfastness on Courtland 4024DP felt side of 98 percent.

EXAMPLE XII

An ink composition was prepared by simple mixing of ingredients comprising 80 percent by weight water, 10 percent by weight sulfolane (medical grade, obtained from Phillips 66 Company, Bartlesville, Okla.), and 3.5 percent by weight Carolina Direct Yellow 86 (high purity, obtained from Carolina Color and chemical) to result in an ink of pH=8.30 with a residual visible filter waterfastness of 70 percent. The addition of 0.05 percent by weight N,N'-bis(3-aminopropyl)-1,2-ethylenediamine (reagent grade, obtained from Aldrich Chemical Co., Milwaukee, Wis.) brought the pH to 11.71. The pH was reduced to 8.27 by the addition of 6.0 percent by weight 1.5 Molar sulfuric acid (ACS grade, obtained from J. T. Baker, Phillipsburg, N.J.) to yield a precipitate free ink with a residual waterfastness of 94 percent.

EXAMPLE XIII

An ink composition was prepared by simple mixing of ingredients comprising 3.9 percent by weight Duasyn Brilliant Red F3B SF VP 218 (high purity solid, obtained from Hoechst, Coventry, R.I.), 76 percent by weight water, 8 percent by weight sulfolane (medical grade, obtained from Phillips 66 Company, Bartlesville, Okla.), and 7 percent by weight N-methylpyrrolidinone (ACS grade, obtained from J. T. Baker, Phillipsburg, N.J.) at which point the pH=2.80 and the residual waterfastness on Courtland paper was measured with a densitometer with a red filter at 26 percent. To this mixture was then added 1.0 percent by weight N,N'bis(3-aminopropyl)-1,2-ethylenediamine (reagent grade, obtained from Aldrich Chemical Co., Milwaukee, Wis.), which brought the pH to 10.59, at which point the residual density waterfastness was assessed at 65 percent. The pH was reduced to 8.79 by the addition of 2.5 percent by weight 3 Molar hydrochloric acid (reagent grade, obtained from Aldrich Chemical Co., Milwaukee, Wis.) to yield a stable ink. The residual waterfastness on Courtland paper was 89 percent. The addition of 1.0 percent by weight ammonium chloride (ACS grade, obtained from Aldrich Chemical Co., Milwaukee, Wis.) dropped the pH to 8.38, at which point the ink exhibited a waterfastness on Courtland 4024DP of 100 percent. The pH was reduced to 8.01 by the addition of 0.5 percent by weight 3 Molar hydrochloric acid (reagent grade, obtained from Aldrich Chemical Co., Milwaukee, Wis.) to yield a stable ink with a residual waterfastness of 98 percent on Courtland paper.

EXAMPLE XIV

An ink composition was prepared by simple mixing of ingredients comprising 67.7 percent by weight water, 8 percent by weight sulfolane (medical grade, obtained from Philips 66 Company, Bartlesville, Okla.), 7 percent by weight N-methyl pyrrolidinone (ACS grade, obtained from J. T. Baker, Phillipsburg, N.J.), and 10.6 percent by weight Pontamine Brilliant Violet BRW (C.I. Direct Violet 99) (33 percent by weight dye solids, obtained from Miles Incorporated, Pittsburgh, Pa.). The residual waterfastness on Courtland paper at this point in the ink preparation (pH=8.27, prior to the addition of waterfastness additives, measured with a magenta filter) was 77 percent. The addition of 1.0 percent by weight N,N'-bis(3-aminopropyl)-1,2- ethylenediamine (reagent grade, obtained from Aldrich Chemical Co., Milwaukee, Wis.) brought the pH to 10.80. The pH was reduced to 8.92 by the addition of 3.0 percent by weight 3 Molar hydrochloric acid (reagent grade, obtained from Aldrich Chemical Co., Milwaukee, Wis.) to yield to precipitate free ink. The residual waterfastness on Courtland paper was 92 percent. The addition of 1.0 percent by weight ammonium chloride (ACS grade, obtained from Aldrich Chemical Co., Milwaukee, Wis.) dropped the precipitate free ink pH to 8.63. The pH was reduced to 8.05 by the addition of 1.7 percent by weight 3 Molar hydrochloric acid (reagent grade, obtained from Aldrich Chemical Co., Milwaukee, Wis.) to yield a precipitate free ink. The residual waterfastness on Courtland 4024DP felt side was assessed at 100 percent with the magenta filter.

EXAMPLE XV

An ink composition was prepared by simple mixing of ingredients comprising 40.1 percent by weight water, 8 percent by weight sulfolane (medical grade, obtained from Phillips 66 Company, Bartlesville, Okla.), 7 percent by weight N-methyl pyrrolidinone (ACS grade, obtained from J. T. Baker, Phillipsburg, N.J.), and 35 percent by weight Project Magenta Liquid 1 (10 percent by weight solid content, obtained from ICI, Wilmington, Del.). The residual waterfastness on Courtland paper at this point in the ink preparation (pH=7.35, prior to the addition of waterfastness additives, measured with a magenta filter) was 27 percent. The addition of 1.6 percent by weight N,N'-bis(3-aminopropyl)-1,2-ethylenediamine (reagent grade, obtained from Aldrich Chemical Co., Milwaukee, Wis.) brought the pH to 11.23. The pH was reduced to 8.89 by the addition of 6.3 percent by weight 3 Molar hydrochloric acid (reagent grade, obtained from Aldrich Chemical Co., Milwaukee, Wis.) to yield a precipitate free ink. The residual waterfastness on Courtland paper was 85 percent. The addition of 2.0 percent by weight ammonium bromide (ACS grade, obtained from Aldrich Chemical Co., Milwaukee, Wis.) dropped the precipitate free ink pH to 8.60. The residual waterfastness on Courtland 4024DP felt side was 92 percent.

EXAMPLE XVI

An ink composition was prepared by simple mixing of ingredients comprising 69.8 percent by weight water, 1.0 percent by weight ammonium chloride (ACS grade, obtained from Aldrich Chemical Co., Milwaukee, Wis.), 1.2 percent by weight 1,4-bis(3-aminopropyl)piperazine (reagent grade, obtained from Aldrich Chemical Co., Milwaukee, Wis.), 11.5 percent by weight Basacid X-34 process black dye (33 percent by weight solid content, obtained from BASF Wyandotte Corp., Holland, Mich.), 8 percent by weight sulfolane (medical grade, obtained from Phillips 66 Company, Bartlesville, Okla.), and 7 percent by weight N-methyl pyrrolidinone (ACS grade, obtained from J. T. Baker, Phillipsburg, N.J.) to yield an ink of pH=9.06. The residual waterfastness of this ink on Courtland 4024DP felt side was 87 percent. The pH of the ink was reduced to 8.07 by the addition of 2.6 percent by weight 3 Molar hydrochloric acid (reagent grade, obtained from Aldrich Chemical Co., Milwaukee, Wis.) to yield a precipitate free ink. The residual waterfastness on Courtland 4024DP felt side was assessed at 88 percent with the visible filter.

EXAMPLE XVII

An ink composition was prepared by simple mixing of ingredients comprising 30 percent by weight first generation Starburst TM dendrimer based on an ethylenediamine core (reagent grade 10 percent by weight aqueous solution, obtained from Michigan Molecular Institute, Midland, Mich.), 34.8 percent by weight water, 1 percent by weight ammonium chloride (ACS grade, obtained from Aldrich Chemical Co., Milwaukee, Wis.), 8 percent by weight sulfolane (medical grade, obtained from Phillips 66 Company, Bartlesville, Okla.), 7 percent by weight N-methyl pyrrolidinone (ACS grade, obtained from J. T. Baker, Phillipsburg, N.J.), 11.2 percent by weight Basacid X-34 process black dye (33 percent by weight solid content, obtained from BASF Wyandotte Corp., Holland, Mich.), and 8 percent by weight of 3 Molar hydrochloric acid (reagent grade, obtained from Aldrich Chemical Co., Milwaukee, Wis.) to yield a precipitate free ink of pH=8.13. The residual waterfastness on Courtland 4024DP felt side was assessed at 99 percent with the visible filter.

EXAMPLE XVIII

An ink composition was prepared by simple mixing of ingredients comprising 70.8 percent by weight water, 0.8 percent by weight N,N'bis(2-aminoethyl)-1,3-propanediamine (reagent grade, obtained from Aldrich Chemical Co., Milwaukee, Wis.), 10 percent by weight sulfolane (medical grade, obtained from Phillips 66 Company, Bartlesville, Okla.), 11.1 percent by weight Basacid X-34 process black dye (33 percent by weight solid content, obtained from BASF Wyandotte Corp., Holland, Mich.), and 7.3 percent by weight of 3 Molar hydrochloric acid (reagent grade, obtained from Aldrich Chemical Co., Milwaukee, Wis.) to yield a precipitate free ink of pH=7.90. The residual waterfastness on Courtland 4024DP felt side was assessed at 92 percent with the visible filter.

EXAMPLE XIX

An ink composition was prepared by simple mixing of ingredients comprising 88 percent by weight water, 10 percent by weight sulfolane (medical grade, obtained from Phillips 66 Company, Bartlesville, Okla.), 11 percent by weight Basacid X-34 process black dye (33 percent by weight solid content, obtained from BASF Wyandotte Corp., Holland, Mich.), 0.35 percent by weight triethylenetetraamine (Texlin 300, obtained from Texaco, Inc., Beacon, N.Y.), and 1.6 percent by weight of 1.5 Molar sulfuric acid (ACS grade, obtained from J. T. Baker, Phillipsburg, N.J.) to yield a precipitate free ink of pH=8.03. The residual waterfastness on Courtland 4024DP felt side was assessed at 72 percent with the visible filter.

EXAMPLE XX

An ink composition was prepared by simple mixing of ingredients comprising 87.8 percent by weight water, 10 percent by weight sulfolane (medical grade, obtained from Phillips 66 Company, Bartlesville, Okla.), 11 percent by weight Basacid X-34 process black dye (33 percent by weight solid content, obtained from BASF Wyandotte Corp., Holland, Mich.), 0.4 percent by weight tetraethylenepentamine (Texlin 400, obtained from Texaco, Inc., Beacon, N.Y.), and 1.8 percent by weight of 1.5 molar sulfuric acid (ACS grade, obtained from J. T. Baker, Phillipsburg, N.J.) to yield a precipitate free ink of pH=8.13. The residual waterfastness on Courtland 4024DP felt side was assessed at 84 percent with the visible filter.

EXAMPLE XXI

An ink composition was prepared by simple mixing of ingredients comprising 85.5 percent by weight water, 10 percent by weight sulfolane (medical grade, obtained from Phillips 66 Company, Bartlesville, Okla.), 11 percent by weight Basacid X-34 process black dye (33 percent by weight solid content, obtained from BASF Wyandotte Corp., Holland, Mich.), 0.5 percent by weight diethylenetriamine (DETA, obtained from Texaco, Inc., Beacon, N.Y.), and 4 percent by weight of 1.5 Molar sulfuric acid (ACS grade, obtained from J. T. Baker, Phillipsburg, N.J.) to yield a precipitate free ink of pH=8. The residual waterfastness on Courtland 4024DP felt side was assessed at 71 percent with the visible filter.

EXAMPLE XXII

An ink composition was prepared by simple mixing of ingredients comprising 67.4 percent by weight water, 11.6 percent by weight Basacid X-34 process black dye (33 percent by weight solid content, obtained from BASF Wyandotte Corp., Holland, Mich.), 8 percent by weight sulfolane (medical grade, obtained from Phillips 66 Company, Bartlesville, Okla.), 7 percent by weight 2-pyrrolidinone (ACS grade, obtained from Aldrich Chemical Co., Milwaukee, Wis.), 1.1 percent by weight tetraethylenepentaamine (TEPA, obtained from Aldrich Chemical Co., Milwaukee, Wis.), and 2.5 percent by weight acetic acid (50 percent aqueous, obtained from Aldrich Chemical Co., Milwaukee, Wis.) to result in a pH of 8.91, at which point the residual waterfastness was assessed on Courtland 4024DP paper at 93 percent. To this mixture was added 0.9 percent by weight ammonium acetate (reagent grade, obtained from Aldrich Chemical Co., Milwaukee, Wis.) and 1.5 percent by weight acetic acid (50 percent aqueous, obtained from Aldrich Chemical Co., Milwaukee, Wis.) to drop the pH to 8.26, at which point the residual waterfastness was assessed on Courtland 4024DP paper to be 97 percent. This ink study demonstrates the significant synergistic improvement in waterfastness through the addition of ammonium acetate to the polyamine system.

EXAMPLE XXIII (COMPARATIVE)

An ink composition was prepared by simple mixing of ingredients comprising 66.2 percent by weight water, 11.6 percent by weight Basacid X-34 process black dye (33 percent by weight solid content, obtained from BASF Wyandotte Corp., Holland, Mich.), 8 percent by weight sulfolane (medical grade, obtained from Phillips 66 Company, Bartlesville, Okla.), and 7 percent by weight 2-pyrrolidinone (ACS grade, obtained from Aldrich Chemical Co., Milwaukee, Wis.), at which point the pH=7.43 and the residual waterfastness was assessed on Courtland 4024 DP paper at 58 percent. To this mixture was added 1.7 percent by weight permethylated tetraethylenepentaamine (TEPA, obtained from Aldrich Chemical Co., Milwaukee, Wis., using the procedure disclosed in IBM U.S. Pat. No. 4,155,768, the disclosure of which is totally incorporated herein by reference, with complete methylation verified by proton and C13 nuclear magnetic resonance spectroscopy) and 0.6 percent by weight acetic acid (50 percent aqueous, obtained from Aldrich Chemical Co., Milwaukee, Wis.) to drop the pH to 8.92, at which point the residual waterfastness was assessed on Courtland 4024DP paper at 57 percent. To this mixture was added 0.9 percent by weight ammonium acetate (reagent grade, obtained from Aldrich Chemical Co., Milwaukee, Wis.) and 2.5 percent by weight acetic acid (50 percent aqueous, obtained from Aldrich Chemical Co., Milwaukee, Wis.) to drop the pH to 8.05, at which point the residual waterfastness of the stable ink was assessed on Courtland 4024DP paper at 78 percent. To this mixture was added 1.5 percent by weight acetic acid (50 percent aqueous, obtained from Aldrich Chemical Co., Milwaukee, Wis.) to drop the pH to 7.02, at which point the residual waterfastness of the stable ink was assessed on Courtland 4024DP paper at 76 percent.

EXAMPLE XXIV (COMPARATIVE)

An ink composition was prepared by simple mixing of ingredients comprising 73.2 percent by weight water, 10.7 percent by weight Basacid X-34 process black dye (33 percent by weights solid content, obtained from BASF Wyandotte Corp., Holland, Mich.), 10 percent by weight sulfolane (medical grade, obtained from Phillips 66 Company, Bartlesville, Okla.), 2.1 percent by weight hexamethyleneimine (reagent grade, obtained from Aldrich Chemical Co., Milwaukee, Wis.), and 4 percent by weight of 3 Molar hydrochloric acid (reagent grade, obtained from Aldrich Chemical Co., Milwaukee, Wis.) to yield a precipitate free ink of pH=7.05. The residual waterfastness on Courtland 4024DP felt side was assessed at 54 percent with the visible filter.

EXAMPLE XXV

An ink composition was prepared by simple mixing of ingredients comprising 70.7 percent by weight water, 11.5 percent by weight Basacid X-34 process black dye (33 percent by weight solid content, obtained from BASF Wyandotte Corp., Holland, Mich.), 8 percent by weight sulfolane (medical grade, obtained from Phillips 66 Company, Bartlesville, Okla.), 7 percent by weight N-methyl pyrrolidinone (ACS grade, obtained from J. T. Baker, Phillipsburg, N.J.), 0.5 percent by weight N,N'-bis(3-aminopropyl)-1,2-ethylenediamine (reagent grade, obtained from Aldrich Chemical Co., Milwaukee, Wis.), 0.8 percent by weight tris(hydroxymethyl) aminomethane (reagent grade TRIS, obtained from Aldrich Chemical Co., Milwaukee, Wis.), and 1.5 percent by weight of 3 Molar hydrochloric acid (reagent grade, obtained from Aldrich Chemical Co., Milwaukee, Wis.) to yield a precipitate free ink of pH=7.99. The residual waterfastness on Courtland 4024DP felt side was assessed at 89 percent with the visible filter.

EXAMPLE XXVI

An ink composition was prepared by simple mixing of ingredients comprising 69.4 percent by weight water, 11.5 percent by weight Basacid X-34 process black dye (33 percent by weight solid content, obtained from BASF Wyandotte Corp., Holland, Mich.), 8 percent by weight sulfolane (medical grade, obtained from Phillips 66 Company, Bartlesville, Okla.), 7 percent by weight N-methyl pyrrolidinone (ACS grade, obtained from J. T. Baker, Phillipsburg, N.J.), 0.5 percent by weight N,N'-bis(3-aminopropyl)-1,2-ethylenediamine (reagent grade, obtained from Aldrich Chemical Co., Milwaukee, Wis.), 1.1 percent by weight triethanolamine (reagent grade TEA, obtained from Aldrich Chemical Co., Milwaukee, Wis.), and 2.5 percent by weight of 3 Molar hydrochloric acid (reagent grade, obtained from Aldrich Chemical Co., Milwaukee, Wis.) to yield a precipitate free ink of pH=7.99. The residual waterfastness on Courtland 4024DP felt side was assessed at 89 percent with the visible filter.

EXAMPLE XXVII

An ink composition was prepared by simple mixing of ingredients comprising 68.2 percent by weight water, 11.5 percent by weight Basacid X-34 process black dye (33 percent by weight solid content, obtained from BASF Wyandotte Corp., Holland, Mich.), 8 percent by weight sulfolane (medical grade, obtained from Phillips 66 Company, Bartlesville, Okla.), 7 percent by weight N-methyl pyrrolidinone (ACS grade, obtained from J. T. Baker, Phillipsburg, N.J.), 0.5 percent by weight N,N'-bis(3-aminopropyl)-1,2-ethylenediamine (reagent grade, obtained from Aldrich Chemical Co., Milwaukee, Wis.), 0.5 percent by weight ethanolamine (reagent grade, obtained from Aldrich Chemical Co., Milwaukee, Wis.), and 4.3 percent by weight of 3 Molar hydrochloric acid (reagent grade, obtained from Aldrich Chemical Co., Milwaukee, Wis.) to yield a precipitate free ink of pH=7.96. The residual waterfastness on Courtland 4024DP felt side was assessed at 89 percent with the visible filter.

EXAMPLE XXVIII

An ink composition was prepared by simple mixing of ingredients comprising 67.9 percent by weight water, 11.5 percent by weight Basacid X-34 process black dye (33 percent by weight solid content, obtained from BASF Wyandotte Corp., Holland, Mich.), 8 percent by weight sulfolane (medical grade, obtained from Phillips 66 Company, Bartlesville, Okla.), 7 percent by weight N-methyl pyrrolidinone (ACS grade, obtained from J. T. Baker, Phillipsburg, N.J.), 0.5 percent by weight N,N'-bis(3-aminopropyl)-1,2-ethylenediamine (reagent grade, obtained from Aldrich Chemical Co., Milwaukee, Wis.), 2.5 percent by weight tris(2-methoxyethoxyethyl)amine (reagent grade TDA-1, obtained from Aldrich Chemical Co., Milwaukee, Wis.), and 2.6 percent by weight of 3 Molar hydrochloric acid (reagent grade, obtained from Aldrich Chemical Co., Milwaukee, Wis.) to yield a precipitate free ink of pH=8.02. The residual waterfastness on Courtland 4024DP felt side was assessed at 83 percent with the visible filter.

EXAMPLE XXIX

An ink composition was prepared by simple mixing of ingredients comprising 68.3 percent by weight water, 11.5 percent by weight Basacid X-34 process black dye (33 percent by weight solid content, obtained from BASF Wyandotte Corp., Holland, Mich.), 8 percent by weight sulfolane (medical grade, obtained from Phillips 66 Company, Bartlesville, Okla.), 7 percent by weight N-methyl pyrrolidinone (ACS grade, obtained from J. T. Baker, Phillipsburg, N.J.), 0.5 percent by weight N,N'-bis(3-aminopropyl)-1,2-ethylenediamine (reagent grade, obtained from Aldrich Chemical Co., Milwaukee, Wis.), 0.6 percent by weight methylamine (reagent grade 40 percent aqueous, obtained from Aldrich Chemical Co., Milwaukee, Wis.), and 4.1 percent by weight of 3 molar hydrochloric acid (reagent grade, obtained from Aldrich Chemical Co., Milwaukee, Wis.) to yield a precipitate free ink of pH=8.01. The residual waterfastness on Courtland 4024DP felt side was assessed at 95 percent with the visible filter.

EXAMPLE XXX

An ink composition was prepared by simple mixing of ingredients comprising 55.6 percent by weight water, 11.3 percent by weight Basacid X-34 process black dye (33 percent by weight solid content, obtained from BASF Wyandotte Corp., Holland, Mich.), 8 percent by weight sulfolane (medical grade, obtained from Phillips 66 Company, Bartlesville, Okla.), 7 percent by weight N-methyl pyrrolidinone (ACS grade, obtained from J. T. Baker, Phillipsburg, N.J.), 1.1 percent by weight N,N'-bis(3-aminopropyl)-1,2-ethylenediamine (reagent grade, obtained from Aldrich Chemical Co., Milwaukee, Wis.), 1.4 percent by weight diethylamine (reagent grade, obtained from Aldrich Chemical Co., Milwaukee, Wis.), and 15.6 percent by weight of 3 Molar hydrochloric acid (reagent grade, obtained from Aldrich Chemical Co., Milwaukee, Wis.) to yield a precipitate free ink of pH=8.10. The residual waterfastness on Courtland 4024DP felt side was assessed at 94 percent with the visible filter.

EXAMPLE XXXI

An ink composition was prepared by simple mixing of ingredients comprising 52.4 percent by weight water, 11.1 percent by weight Basacid X-34 process black dye (33 percent by weight solid content, obtained from BASF Wyandotte Corp., Holland, Mich.), 8 percent by weight sulfolane (medical grade, obtained from Phillips 66 Company, Bartlesville, Okla.), 7 percent by weight N-methyl pyrrolidinone (ACS grade, obtained from J. T. Baker, Phillipsburg, N.J.), 1.1 percent by weight N,N'-bis(3-aminopropyl)-1,2-ethylenediamine (reagent grade, obtained from Aldrich Chemical Co., Milwaukee, Wis.), 1.1 percent by weight ethylenediamine (reagent grade, obtained from Aldrich Chemical Co., Milwaukee, Wis.), and 19.3 percent by weight of 3 molar hydrochloric acid (reagent grade obtained from Aldrich Chemical Co., Milwaukee, Wis.) to yield a precipitate free ink of pH=7.99. The residual waterfastness on Courtland 4024DP felt side was assessed at 91 percent with the visible filter.

EXAMPLE XXXII

An ink composition was prepared by simple mixing of ingredients comprising 70.4 percent by weight water, 11.2 percent by weight Basacid X-34 process black dye (33 percent by weight solid content, obtained from BASF Wyandotte Corp., Holland, Mich.), 8 percent by weight sulfolane (medical grade, obtained from Phillips 66 Company, Bartlesville, Okla.), 7 percent by weight N-methyl pyrrolidinone (ACS grade, obtained from J. T. Baker, Phillipsburg, N.J.), 1.0 percent by weight N,N'-bis(3-aminopropyl)-1,2-ethylenediamine (reagent grade, obtained from Aldrich Chemical Co., Milwaukee, Wis.), and 2.4 percent by weight 2-aminoethylphosphonic acid (reagent grade, obtained from Aldrich Chemical Co., Milwaukee, Wis.) to yield a precipitate free ink of pH=7.68. The residual waterfastness on Courtland 4024DP felt side was assessed at 96 percent with the visible filter.

EXAMPLE XXXIII

An ink composition was prepared by simple mixing of ingredients comprising 52.4 percent by weight water, 11 percent by weight Basacid X-34 process black dye (33 percent by weight solid content, obtained from BASF Wyandotte Corp., Holland, Mich.), 8 percent by weight sulfolane (medical grade, obtained from Phillips 66 Company, Bartlesville, Okla.), 7 percent by weight N-methyl pyrrolidinone (ACS grade, obtained from J. T. Baker, Phillipsburg, N.J.), 1.1 percent by weight N,N'-bis(3-aminopropyl)-1,2-ethylenediamine (reagent grade, obtained from Aldrich Chemical Co., Milwaukee, Wis.), 2.3 percent by weight taurine (reagent grade 2-aminoethylsulfonic acid, obtained from Aldrich Chemical Co., Milwaukee, Wis.), and 6 percent by weight of 3 Molar hydrobromic acid (reagent grade, obtained from Aldrich Chemical Co., Milwaukee, Wis.) to yield a precipitate free ink of pH=8.02. The residual waterfastness on Courtland 4024DP felt side was assessed at 97 percent with the visible filter.

EXAMPLE XXXIV

An ink composition was prepared by simple mixing of ingredients comprising 52.4 percent by weight water, 11 percent by weight Basacid X-34 process black dye (33 percent by weight solid content, obtained from BASF Wyandotte Corp., Holland, Mich.), 8 percent by weight sulfolane (medical grade, obtained from Phillips 66 Company, Bartlesville, Okla.), 7 percent by weight N-methyl pyrrolidinone (ACS grade, obtained from J. T. Baker, Phillipsburg, N.J.), 1.1 percent by weight N,N'-bis(3-aminopropyl)-1,2-ethylenediamine (reagent grade, obtained from Aldrich Chemical Co., Milwaukee, Wis.), 2.1 percent by weight 2-aminoethylthiol hydrochloride (reagent grade, obtained from Aldrich Chemical Co., Milwaukee, Wis.), and 5 percent by weight of 3 Molar hydrobromic acid (reagent grade, obtained from Aldrich Chemical Co., Milwaukee, Wis.) to yield a precipitate free ink of pH=8.08. The residual waterfastness on Courtland 4024DP felt side was assessed at 97 percent with the visible filter.

EXAMPLE XXXV

An ink composition was prepared by simple mixing of ingredients comprising 52.4 percent by weight water, 11 percent by weight Basacid X-34 process black dye (33 percent by weight solid content, obtained from BASF Wyandotte Corp., Holland, Mich.), 8 percent by weight sulfolane (medical grade, obtained from Phillips 66 Company, Bartlesville, Okla.), 7 percent by weight N-methyl pyrrolidinone (ACS grade, obtained from J. T. Baker, Phillipsburg, N.J.), 1.1 percent by weight N,N'-bis(3-aminopropyl)-1,2-ethylenediamine (reagent grade, obtained from Aldrich Chemical Co., Milwaukee, Wis.), 2.0 percent by weight 4-aminobutyric acid (reagent grade, obtained from Aldrich Chemical Co., Milwaukee, Wis.), and 6.7 percent by weight of 3 Molar hydrobromic acid (reagent grade, obtained from Aldrich Chemical Co., Milwaukee, Wis.) to yield a precipitate free ink of pH=8.05. The residual waterfastness on Courtland 4024DP felt side was assessed at 96 percent with the visible filter.

EXAMPLE XXXVI

An ink composition was prepared by simple mixing of ingredients comprising 70.7 percent by weight water, 10.6 percent by weight Basacid X-34 process black dye (33 percent by weight solid content, obtained from BASF Wyandotte Corp., Holland, Mich.), 0.3 percent by weight Duasyn Brilliant Red F3B SF VP 218 (high purity solid, obtained from Hoechst, Coventry, R.I.), 8 percent by weight sulfolane (medical grade, obtained from Phillips 66 Company, Bartlesville, Okla.), 7 percent by weight N-methyl pyrrolidinone (ACS grade, obtained from J. T. Baker, Phillipsburg, N.J.), 1.0 percent by weight N,N'-bis(3-aminopropyl)-1,2-ethylenediamine (reagent grade, obtained from Aldrich Chemical Co., Milwaukee, Wis.), 0.65 percent by weight ammonium hydroxide (reagent grade 33 percent ammonia by weight, obtained from Aldrich Chemical Co., Milwaukee, Wis.), and 1.7 percent by weight ethylenediaminetetraacetic acid (reagent grade EDTA, obtained from Aldrich Chemical Co., Milwaukee, Wis.) to yield a precipitate free ink of pH=8.21. The residual waterfastness on Courtland 4024DP felt side was assessed at 95 percent with the visible filter.

EXAMPLE XXXVII

An ink composition was prepared by simple mixing of ingredients comprising 63.6 percent by weight water, 11.7 percent by weight Basacid X-34 process black dye (33 percent by weight solid content, obtained from BASF Wyandotte Corp., Holland, Mich.), 8 percent by weight sulfolane (medical grade, obtained from Phillips 66 Company, Bartlesville, Okla.), 7 percent by weight 2-pyrrolidinone (reagent grade, GAF Chemicals Corp., Wayne, N.J.), 1.0 percent by weight N,N'-bis(3-aminopropyl)-1,2-ethylenediamine (reagent grade, obtained from Aldrich Chemical Co., Milwaukee, Wis.), 1.7 percent by weight ammonium iodide (reagent grade, obtained from Aldrich Chemical Co., Milwaukee, Wis.), and 7 percent by weight of 3 molar hydrobromic acid (reagent grade, obtained from Aldrich Chemical Co., Milwaukee, Wis.) to yield a precipitate free ink of pH=8.07. The residual waterfastness on Courtland 4024DP felt side was assessed at 100 percent with the visible filter. This ink, when printed from a Deskjet-500 cartridge, was found to yield prints which after a 5 minute dry time resisted any trace of purple dye plume from water soak for 10 minutes.

EXAMPLE XXXVIII

An ink composition was prepared by simple mixing of ingredients comprising 67.4 percent by weight water, 11.5 percent by weight Basacid X-34 process black dye (33 percent by weight solid content, obtained from BASF Wyandotte Corp., Holland, Mich.), 8 percent by weight sulfolane (medical grade, obtained from Phillips 66 Company, Bartlesville, Okla.), 7 percent by weight 2-pyrrolidinone (reagent grade, GAF Chemicals Corp., Wayne, N.J.), 1.2 percent by weight N,N'-bis(3-aminopropyl)-1,2-ethylenediamine (reagent grade, obtained from Aldrich Chemical Co., Milwaukee, Wis.), 0.9 percent by weight ammonium carbamate (reagent grade, obtained from Aldrich Chemical Co., Milwaukee, Wis.), and 4 percent by weight of 50 percent aqueous formic acid (reagent grade, obtained from Aldrich Chemical Co., Milwaukee, Wis.) to yield a precipitate free ink of pH=8.09. The residual waterfastness on Courtland 4024DP felt side was assessed at 99 percent with the visible filter.

EXAMPLE XXXIX

An ink composition was prepared by simple mixing of ingredients comprising 67.1 percent by weight water, 11.6 percent by weight Basacid X-34 process black dye (33 percent by weight solid content, obtained from BASF Wyandotte Corp., Holland, Mich.), 8 percent by weight sulfolane (medical grade, obtained from Phillips 66 Company, Bartlesville, Okla.), 7 percent by weight 2-pyrrolidinone (reagent grade, GAF Chemicals Corp., Wayne, N.J.), 1.0 percent by weight N,N'-bis(3-aminopropyl)-1,2-ethylenediamine (reagent grade, obtained from Aldrich Chemical Co., Milwaukee, Wis.), 0.8 percent by weight ammonium phosphate dibasic (reagent grade, obtained from Aldrich Chemical Co., Milwaukee, Wis.), and 4.3 percent by weight of 3 molar phosphoric acid (reagent grade, obtained from Aldrich Chemical Co., Milwaukee, Wis.) to yield a precipitate free ink of pH=8.09, with 0.1 percent by weight Dowicil 150 biocide (product grade, Dow Chemical Co., Midland, Mich.) and 0.05 percent by weight Carbowax M20 (a polyethyleneoxide/bisphenol-A polymer added as final ingredients. The residual waterfastness on Courtland 4024DP felt side was assessed at 96 percent with the visible filter. The excellent resistance to dye plume of prints made with this ink on an alkaline paper was comparable to that obtained with an acid sized paper such as Courtland 4024DP.

EXAMPLE XL

An ink composition was prepared by simple mixing of ingredients comprising 63.8 percent by weight water, 11.2 percent by weight Basacid X-34 process black dye (33 percent by weight solid content, obtained from BASF Wyandotte Corp., Holland, Mich.), 8 percent by weight sulfolane (medical grade, obtained from Phillips 66 Company, Bartlesville, Okla.), 7 percent by weight N-methyl pyrrolidinone (ACS grade, obtained from J. T. Baker, Phillipsburg, N.J.), 1.1 percent by weight N,N'-bis(3-aminopropyl)-1,2-ethylenediamine (reagent grade, obtained from Aldrich Chemical Co., Milwaukee, Wis.), 1.2 percent by weight ammonium sulfate (reagent grade, obtained from Aldrich Chemical Co., Milwaukee, Wis.), and 7.7 percent by weight of 1.5 Molar sulfuric acid (ACS grade, obtained from J. T. Baker, Phillipsburg, N.J.) to yield a precipitate free ink of pH=8.05. The residual waterfastness on Courtland 4024DP felt side was assessed at 99 percent with the visible filter.

EXAMPLE XLIV

An ink composition was prepared by simple mixing of ingredients comprising 68.4 percent by weight water, 11.5 percent by weight Basacid X-34 process black dye (33 percent by weight solid content, obtained from BASF Wyandotte Corp., Holland, Mich.), 8 percent by weight sulfolane (medical grade, obtained from Phillips 66 Company, Bartlesville, Okla.), 7 percent by weight 2-pyrrolidinone (reagent grade, GAF Chemicals Corp., Wayne, N.J.), 1.1 percent by weight N,N'-bis(3-aminopropyl)-1,2-ethylenediamine (reagent grade, obtained from Aldrich Chemical Co., Milwaukee, Wis.), 1.3 percent by weight ammonium sulfamate (reagent grade, obtained from Aldrich Chemical Co., Milwaukee, Wis.), and 2.7 percent by weight of 50 percent aqueous formic acid (reagent grade, obtained from Aldrich Chemical Co., Milwaukee, Wis.) to yield a precipitate free ink of pH=7.98. The residual waterfastness on Courtland 4024DP felt side was assessed at 98 percent with the visible filter.

EXAMPLE XLII

An ink composition was prepared by simple mixing of ingredients comprising 68.4 percent by weight water, 11.6 percent by weight Basacid X-34 process black dye (33 percent by weight solid content, obtained from BASF Wyandotte Corp., Holland, Mich.), 8 percent by weight sulfolane (medical grade, obtained from Phillips 66 Company, Bartlesville, Okla.), 7 percent by weight 2-pyrrolidinone (reagent grade, GAF Chemicals Corp., Wayne, N.J.), 1.0 percent by weight N,N'-bis(3-aminopropyl)-1,2-ethylenediamine (reagent grade, obtained from Aldrich Chemical Co., Milwaukee, Wis.), 0.7 percent by weight ammonium formate (reagent grade, obtained from Aldrich Chemical Co., Milwaukee, Wis.), and 2.5 percent by weight of 50 percent aqueous formic acid (reagent grade, obtained from Aldrich Chemical Co., Milwaukee, Wis.) to yield a precipitate free ink of pH=8.17. The residual waterfastness on Courtland 4024DP felt side was assessed at 97 percent with the visible filter.

EXAMPLE XLIII

An ink composition was prepared by simple mixing of ingredients comprising 66.4 percent by weight water, 11.7 percent by weight Basacid X-34 process black dye (33 percent by weight solid content, obtained from BASF Wyandotte Corp., Holland, Mich.), 8 percent by weight sulfolane (medical grade, obtained from Phillips 66 Company, Bartlesville, Okla.), 7 percent by weight 2-pyrrolidinone (reagent grade, GAF Chemicals Corp., Wayne, N.J.), 1.0 percent by weight N,N'-bis(3-aminopropyl)-1,2-ethylenediamine (reagent grade, obtained from Aldrich Chemical Co., Milwaukee, Wis.), 1.2 percent by weight ammonium acetate (reagent grade, obtained from Aldrich Chemical Co., Milwaukee, Wis.), and 4.7 percent by weight of 50 percent aqueous acetic acid (reagent grade, obtained from Aldrich Chemical Co., Milwaukee, Wis.) to yield a precipitate free ink of pH=8.08. The residual waterfastness of a Deskjet-500 print on Courtland 4024DP felt side was assessed at 99 percent with the visible filter.

EXAMPLE XLIV

An ink composition was prepared by simple mixing of ingredients comprising 70.5 percent by weight water, 10.6 percent by weight Basacid X-34 process black dye (33 percent by weight solid content, obtained from BASF Wyandotte Corp., Holland, Mich.), 0.3 percent by weight Duasyn Brilliant Red F3B SF VP 218 (high purity solid, obtained from Hoechst, Coventry, R.I.), 8 percent by weight sulfolane (medical grade, obtained from Phillips 66 Company, Bartlesville, Okla.), 7 percent by weight N-methyl pyrrolidinone (ACS grade, obtained from J. T. Baker, Phillipsburg, N.J.), 1.0 percent by weight N,N'-bis(3-aminopropyl)-1,2-ethylenediamine (reagent grade, obtained from Aldrich Chemical Co., Milwaukee, Wis.), 0.65 percent by weight ammonium hydroxide (reagent grade, obtained from Aldrich Chemical Co., Milwaukee, Wis.), and 1.8 percent by weight glycolic acid (reagent grade, powder, obtained from Aldrich Chemical Co., Milwaukee, Wis.) to yield a precipitate free ink of pH=8.16, with 0.1 percent by weight Dowicil 150 biocide (product grade, Dow Chemical Co., Midland, Mich.) and 0.05 percent by weight Carbowax M20 (a polyethyleneoxide/bisphenol-A polymer added as final additives. The residual waterfastness on Courtland 4024DP felt side was assessed at 99 percent with the visible filter.

EXAMPLE XLV

An ink composition was prepared by simple mixing of ingredients comprising 65.6 percent by weight water, 10.6 percent by weight Basacid X-34 process black dye (33 percent by weight solid content, obtained from BASF Wyandotte Corp., Holland, Mich.), 0.3 percent by weight Duasyn Brilliant Red F3B SF VP 218 (high purity solid, obtained from Hoechst, Coventry, R.I.), 8 percent by weight sulfolane (medical grade, obtained from Phillips 66 Company, Bartlesville, Okla.), 7 percent by weight N-methyl pyrrolidinone (ACS grade, obtained from J. T. Baker, Phillipsburg, N.J.), 1.0 percent by weight N,N'-bis(3-aminopropyl)-1,2-ethylenediamine (reagent grade, obtained from Aldrich Chemical Co., Milwaukee, Wis.), 0.65 percent by weight ammonium hydroxide (reagent grade, obtained from Aldrich Chemical Co., Milwaukee, Wis.), and 6.7 percent by weight boric acid (reagent grade, powder, obtained from Aldrich Chemical Co Milwaukee, Wis.) to yield a precipitate free ink of pH=8.16, with 0.1 percent by weight Dowicil 150 biocide (product grade, Dow Chemical Co., Midland, Mich.) and 0.05 percent by weight Carbowax M20 (a polyethyleneoxide/bisphenol-A polymer added as final additives. The residual waterfastness on Courtland 4024DP felt side was assessed at 94 percent with the visible filter.

EXAMPLE XLVI

An ink composition was prepared by simple mixing of ingredients comprising 62.6 percent by weight water, 10.6 percent by weight Basacid X-34 process black dye (33 percent by weight solid content, obtained from BASF Wyandotte Corp., Holland, Mich.), 0.3 percent by weight Duasyn Brilliant Red F3B SF VP 218 (high purity solid, obtained from Hoechst, Coventry, R.I.), 8 percent by weight sulfolane (medical grade, obtained from Phillips 66 Company, Bartlesville, Okla.), 7 percent by weight N-methyl pyrrolidinone (ACS grade, obtained from J. T. Baker, Phillipsburg, N.J.), 1.0 percent by weight N,N'-bis(3-aminopropyl)-1,2-ethylenediamine (reagent grade, obtained from Aldrich Chemical Co., Milwaukee, Wis.), 0.65 percent by weight ammonium hydroxide (reagent grade, obtained from Aldrich Chemical Co., Milwaukee, Wis.), and 9.7 percent by weight of 50 percent aqueous gluconic acid (reagent grade, obtained from Aldrich Chemical Co., Milwaukee, Wis.) to yield a precipitate free ink of pH=8.16, with 0.1 percent by weight Dowicil 150 biocide (product grade, Dow Chemical Co., Midland, Mich.) and 0.05 percent by weight Carbowax M20 (a polyethyleneoxide/bisphenol-A polymer added as final additives. The residual waterfastness on Courtland 4024DP felt side was assessed at 97 percent with the visible filter.

EXAMPLE XLVII

An ink composition was prepared by simple mixing of ingredients comprising 57.7 percent by weight water, 10.6 percent by weight Basacid X-34 process black dye (33 percent by weight solid content, obtained from BASF Wyandotte Corp., Holland, Mich.), 0.3 percent by weight Duasyn Brilliant Red F3B SF VP 218 (high purity solid, obtained from Hoechst, Coventry, R.I.), 6 percent by weight sulfolane (medical grade, obtained from Phillips 66 Company, Bartlesville, Okla.), 9 percent by weight 2-pyrrolidinone (reagent grade, GAF Chemicals Corp., Wayne, N.J.), 5 percent by weight urea (ACS grade, prill, obtained from Aldrich Chemical Co., Milwaukee, Wis.), 1.0 percent by weight N,N'-bis(3-aminopropyl)-1,2-ethylenediamine (reagent grade, obtained from Aldrich Chemical Co., Milwaukee, Wis.), 0.65 percent by weight ammonium hydroxide (reagent grade, obtained from Aldrich Chemical Co., Milwaukee, Wis.), and 9.6 percent by weight of 12 percent aqueous polyphosphoric acid (reagent grade, obtained from Aldrich Chemical Co., Milwaukee, Wis.) to yield a precipitate free ink of pH=8.37, with 0.1 percent by weight Dowicil 150 biocide (product grade, Dow Chemical Co., Midland, Mich.) and 0.05 percent by weight Carbowax M20 (a polyethyleneoxide/bisphenol-A polymer added as final additives. The residual waterfastness on Courtland 4024DP felt side was assessed at 97 percent with the visible filter.

EXAMPLE XLVIII

An ink composition was prepared by simple mixing of ingredients comprising 62.9 percent by weight water, 11.5 percent by weight Basacid X-34 process black dye (33 percent by weight solid content, obtained from BASF Wyandotte Corp., Holland, Mich.), 8 percent by weight sulfolane (medical grade, obtained from Phillips 66 Company, Bartlesville, Okla.), 7 percent by weight N-methyl pyrrolidinone (ACS grade, obtained from J. T. Baker, Phillipsburg, N.J.), 1.0 percent by weight N,N'-bis(3-aminopropyl)-1,2-ethylenediamine (reagent grade, obtained from Aldrich Chemical Co., Milwaukee, Wis.), 2.3 percent by weight ammonium sulfite monohydrate (reagent grade, obtained from Aldrich Chemical Co., Milwaukee, Wis.), and 7.3 percent by weight of 3 molar hydrobromic acid (reagent grade, obtained from Aldrich Chemical Co., Milwaukee, Wis.) to yield a precipitate free ink of pH=8.04. The residual waterfastness on Courtland 4024DP felt side was assessed at 99 percent with the visible filter.

EXAMPLE XLIX

An ink composition was prepared by simple mixing of ingredients comprising 64.4 percent by weight water, 11.5 percent by weight Basacid X-34 process black dye (33 percent by weight solid content, obtained from BASF Wyandotte Corp., Holland, Mich.), 8 percent by weight sulfolane (medical grade, obtained from Phillips 66 Company, Bartlesville, Okla.), and 7 percent by weight N-methyl pyrrolidinone (ACS grade, obtained from J. T. Baker, Phillipsburg, N.J.) at which point the residual waterfastness on Courtland 4024DP was determined to be 62 percent with a solution pH=7.32. To this mixture was added 1.4 percent by weight ammonium tartrate, tribasic (reagent grade, obtained from Aldrich Chemical Co., Milwaukee, Wis.) to give a mixture with a pH=7.37 and a residual waterfastness on Courtland 4024DP of 64 percent. To this ink was added 1.1 percent by weight N,N'-bis(3-aminopropyl)-1,2-ethylenediamine (reagent grade, obtained from Aldrich Chemical Co., Milwaukee, Wis.), which raised the pH to 9.67 and increased the waterfastness to 95 percent. The pH was lowered to 8.02 by the addition of 6.6 percent by weight of 3 Molar hydrobromic acid (reagent grade, obtained from Aldrich Chemical Co., Milwaukee, Wis.) to yield a precipitate free ink with a residual waterfastness on Courtland 4024DP felt side of 100 percent with the visible filter. This study demonstrates the lack of waterfastness improvement by the addition of an ammonium salt prior to the addition of the tetraamine.

EXAMPLE L

An ink composition was prepared by simple mixing of ingredients comprising 67.1 percent by weight water, 11.1 percent by weight Basacid X-34 process black dye (33 percent by weight solid content, obtained from BASF Wyandotte Corp., Holland, Mich.), 8 percent by weight sulfolane (medical grade, obtained from Phillips 66 Company, Bartlesville, Okla.), 7 percent by weight 2-pyrrolidinone (reagent grade, GAF Chemicals Corp., Wayne, N.J.), 1.1 percent by weight N,N'-bis(3-aminopropyl)-1,2-ethylenediamine (reagent grade, obtained from Aldrich Chemical Co., Milwaukee, Wis.), 1.0 percent by weight ammonium citrate, tribasic (reagent grade, obtained from Aldrich Chemical Co., Milwaukee, Wis.), and 4.7 percent by weight of 2 Molar (6 Normal) citric acid (reagent grade, obtained from Aldrich Chemical Co., Milwaukee, Wis.) to yield a precipitate free ink of pH=8.07. The residual waterfastness of a print generated by incorporating the ink into a Hewlett-Packard Deskjet-500 printer and printing on Courtland 4024DP felt side was assessed at 100 percent with the visible filter.

EXAMPLE LI

An ink composition was prepared by simple mixing of ingredients comprising 64.9 percent by weight water, 11.6 percent by weight Basacid X-34 process black dye (33 percent by weight solid content, obtained from BASF Wyandotte Corp., Holland, Mich.), 8 percent by weight sulfolane (medical grade, obtained from Phillips 66 Company, Bartlesville, Okla.), 7 percent by weight N-methyl pyrrolidinone (ACS grade, obtained from J. T. Baker, Phillipsburg, N.J.), 1.0 percent by weight ammonium chloride (reagent grade, obtained from Aldrich Chemical Co., Milwaukee, Wis.), and 0.5 percent by weight N,N'-bis(3-aminopropyl)-1,2-ethylenediamine (reagent grade, obtained from Aldrich Chemical Co., Milwaukee, Wis.), to give a mixture with a pH=8.65 and a residual waterfastness on Courtland 4024DP of 99 percent. The pH was lowered to 6.97 by the addition of 7.0 percent by weight of 3 Molar hydrochloric acid (reagent grade, obtained from Aldrich Chemical Co., Milwaukee, Wis.) to yield a precipitate free ink with a residual waterfastness on Courtland 4024DP felt side of 99 percent with the visible filter. This study demonstrates the robust high degree of residual waterfastness with respect to pH variation in at least the range of 8.65 to 7 as well as the stability of this particular ink at neutral pH.

EXAMPLE LII

An ink composition was prepared by simple mixing of ingredients comprising 60 grams of water, 1 gram of N,N'-bis(3-aminopropyl)-1,2-ethylenediamine (reagent grade, obtained from Aldrich Chemical Co., Milwaukee, Wis.), 5 grams of urea (obtained from Aldrich), 5 grams of methyl urea (obtained from Aldrich), 5 grams of dimethyl urea (obtained from Aldrich), and 0.7 gram of ammonium hydroxide to yield a mixture with a pH of 12.097. To this mixture was added 2.08 grams of concentrated hydrochloric acid to yield a mixture with a pH of 8.76. To this mixture was then added 0.3 gram of Duasyn Brilliant Red F3B SF VP 218 (high purity solid, obtained from Hoechst, Coventry, R.I.), 10.6 grams of BASF X-34 dye (obtained from BASF), 0.05 gram of polyethylene oxide (Carbowax M20, a polyethyleneoxide/bisphenol-A polymer with a molecular weight of 18,000, obtained from Union Carbide Corporation, Danbury, Conn.), and 0.1 gram of Dowicil 150 biocide (product grade, Dow Chemical Co., Midland, Mich.). The resulting mixture was roll milled for ½ hour, after which additional water was added to the mixture, followed by filtering, to yield 100 grams of an ink. The resulting ink exhibited a pH of 8.196, a viscosity of 1.54 centipoise, and a surface tension of 53.8 milliNewtons per square meter (dynes per square centimeter). When printed onto Xerox Courtland paper with a Hewlett-Packard DeskJet printer, the prints made with these inks exhibited excellent smear resistance (rain drop test) and excellent waterfastness of 98 to 99 percent.

EXAMPLE LIII

An ink composition was prepared by simple mixing of ingredients comprising 60 grams of water, 1 gram of N,N'-bis(3-aminopropyl)-1,2-ethylenediamine (reagent grade, obtained from Aldrich Chemical Co., Milwaukee, Wis.), 8 grams of methyl urea (obtained from Aldrich), 7 grams of dimethyl urea (obtained from Aldrich), and 0.7 gram of ammonium hydroxide to yield a mixture with a pH of 12.05. To this mixture was added 1.97 grams of concentrated hydrochloric acid to yield a mixture with a pH of 8.86. To this mixture was then added 0.3 gram of Duasyn Brilliant Red F3B SF VP 218 (high purity solid, obtained from Hoechst, Coventry, R.I.), 10.6 grams of BASF X-34 dye (obtained from BASF), 0.05 gram of polyethylene oxide (Carbowax M20, a polyethyleneoxide/bisphenol-A polymer with a molecular weight of 18,000, obtained from Union Carbide Corporation, Danbury, Conn.), and 0.1 gram of Dowicil 150 biocide (product grade, Dow Chemical Co., Midland, Mich.). The resulting mixture was roll milled for ½ hour, after which additional water was added to the mixture, followed by filtering, to yield 100 grams of an ink. The resulting ink exhibited a pH of 8.227. When printed onto Xerox Courtland paper with a Hewlett-Packard DeskJet printer, the prints made with these inks exhibited excellent smear resistance (rain drop test) and excellent waterfastness of 98 to 99 percent.

EXAMPLE LIV

An ink composition was prepared by simple mixing of ingredients comprising 60 grams of water, 1 gram of N,N'-bis(3-aminopropyl)-1,2-ethylenediamine (reagent grade, obtained from Aldrich Chemical Co., Milwaukee, Wis.), 5 grams of methyl urea (obtained from Aldrich), 5 grams of dimethyl urea (obtained from Aldrich), 5 grams of tetramethyl urea (obtained from Aldrich), and 0.7 gram of ammonium hydroxide to yield a mixture with a pH of 12.19. To this mixture was added 1.89 grams of concentrated hydrochloric acid to yield a mixture with a pH of 8.94. To this mixture was then added 0.3 gram of Duasyn Brilliant Red F3B SF VP 218 (high purity solid, obtained from Hoechst, Coventry, R.I.), 10.6 grams of BASF X-34 dye (obtained from BASF), 0.05 gram of polyethylene oxide (Carbowax M20, a polyethyleneoxide/bisphenol-A polymer with a molecular weight of 18,000, obtained from Union Carbide Corporation, Danbury, Conn.), and 0.1 gram of Dowicil 150 biocide (product grade, Dow Chemical Co., Midland, Mich.). The resulting mixture was roll milled for ½ hour, after which additional water was added to the mixture to yield 100 grams of an ink. The resulting ink exhibited a pH of 8.33. The pH of the ink was further adjusted by the addition of 3 Normal hydrochloric acid, followed by filtering, to yield an ink with a pH of 8.17. When printed onto Xerox Courtland paper with a Hewlett-Packard DeskJet printer, the prints made with these inks exhibited excellent smear resistance (rain drop test) and excellent waterfastness of 98 to 99 percent.

EXAMPLE LV

An ink composition was prepared by simple mixing of ingredients comprising 60 grams of water, 1 gram of N,N'-bis(3-aminopropyl)-1,2-ethylenediamine (reagent grade, obtained from Aldrich Chemical Co., Milwaukee, Wis.), 10 grams of urea (obtained from Aldrich), 5 grams of dimethyl urea (obtained from Aldrich), and 1 gram of ammonium hydroxide, followed by roll milling the mixture for 5 minutes to yield a mixture with a pH of 12.05. The pH of the mixture was then adjusted by the addition of 1.89 grams of concentrated hydrochloric acid, followed by roll milling for an additional 5 minutes, to yield a mixture with a pH of 8.99. To this mixture was added 0.3 gram of Duasyn Brilliant Red F3B SF VP 218 (high purity solid, obtained from Hoechst, Coventry, R.I.), followed by roll milling the mixture for an additional 5 minutes. Thereafter, 10.6 grams of BASF X-34 dye (obtained from BASF), 0.05 gram of polyethylene oxide (Carbowax M20, a polyethyleneoxide/bisphenol-A polymer with a molecular weight of 18,000, obtained from Union Carbide Corporation, Danbury, Conn.), and 0.1 gram of Dowicil 150 biocide (product grade, Dow Chemical Co., Midland, Mich. were added to the mixture, followed by roll milling for 15 minutes. The resulting mixture had a pH of 8.45. The pH of the mixture was further adjusted by the addition of 3 Normal hydrochloric acid (0.68 gram) to result in an ink with a pH of 8.19. Additional water was added to the mixture, followed by filtering, to yield 100 grams of an ink, which was then roll milled for 30 additional minutes. The ink, when coated onto glass, exhibited some crystallization after 10 minutes. The ink was incorporated into a Hewlett-Packard DeskJet printer and prints were formed on Hammermill and Xerox Courtland paper. The prints exhibited slight feathering on the wire side of the Hammermill paper. When printed onto Xerox Courtland paper with a Hewlett-Packard DeskJet printer, the prints made with these inks exhibited excellent smear resistance (rain drop test) and excellent waterfastness of 98 to 99 percent.

EXAMPLE LVI

An ink composition was prepared by simple mixing of ingredients comprising 60 grams of water, 1 gram of N,N'-bis(3-aminopropyl)-1,2-ethylenediamine (reagent grade, obtained from Aldrich Chemical Co., Milwaukee, Wis.), 10 grams of urea (obtained from Aldrich), 5 grams of methyl urea (obtained from Aldrich), and 0.7 gram of ammonium hydroxide, followed by roll milling the mixture for 5 minutes to yield a mixture with a pH of 12.30. The pH of the mixture was then adjusted by the addition of 1.89 grams of concentrated hydrochloric acid, followed by roll milling for an additional 5 minutes, to yield a mixture with a pH of 8.87. To this mixture was added 0.3 gram of Duasyn Brilliant Red F3B SF VP 218 (high purity solid, obtained from Hoechst, Coventry, R.I.), followed by roll milling the mixture for an additional 5 minutes. Thereafter, 10.6 grams of BASF X-34 dye (obtained from BASF), 0.05 gram of polyethylene oxide (Carbowax M20, a polyethyleneoxide/bisphenol-A polymer with a molecular weight of 18,000, obtained from Union Carbide Corporation, Danbury, Conn.), and 0.1 gram of Dowicil 150 biocide (product grade, Dow Chemical Co., Midland, Mich.) were added to the mixture, followed by roll milling for 15 minutes. The resulting mixture had a pH of 8.43. The pH of the mixture was further adjusted by the addition of 3 Normal hydrochloric acid (0.65 gram) to result in an ink with a pH of 8.19. Additional water was added to the mixture, followed by filtering, to yield 100 grams of an ink, which was then roll milled for 30 additional minutes. The ink, when coated onto glass, exhibited some crystallization after 20 minutes. The ink was incorporated into a Hewlett-Packard DeskJet printer and prints were formed on Hammermill and Xerox Courtland paper. The prints exhibited slight feathering on the wire side of the Hammermill paper. When printed onto Xerox Courtland paper with a Hewlett-Packard DeskJet printer, the prints made with these inks exhibited excellent smear resistance (rain drop test) and excellent waterfastness of 98 to 99 percent.

EXAMPLE LVII

An ink composition was prepared by simple mixing of ingredients comprising 65.4 grams of water, 1 gram of N,N'-bis(3-aminopropyl)-1,2-ethylenediamine (reagent grade, obtained from Aldrich Chemical Co., Milwaukee, Wis.), 10 grams of methyl urea (obtained from Aldrich), and 0.7 gram of ammonium hydroxide, followed by roll milling the mixture for 5 minutes to yield a mixture with a pH of 11.85. The pH of the mixture was then adjusted by the addition of 3.04 grams of concentrated hydrobromic acid, followed by roll milling for an additional 5 minutes, to yield a mixture with a pH of 8.96. To this mixture was added 0.3 gram of Duasyn Brilliant Red F3B SF VP 218 (high purity solid, obtained from Hoeschst, Coventry, R.I.), followed by roll milling the mixture for an additional 5 minutes. Thereafter, 10.6 grams of BASF X-34 dye (obtained from BASF), 0.05 gram of polyethylene oxide (Carbowax M20, a polyethyleneoxide/bisphenol-A polymer with a molecular weight of 18,000, obtained from Union Carbide Corporation, Danbury, Conn.), and 0.1 gram of Dowicil 150 biocide (product grade, Dow Chemical Co., Midland, Mich.) were added to the mixture, followed by roll milling for 15 minutes. The resulting mixture had a pH of 8.31. The pH of the mixture was further adjusted by the addition of 3 Normal hydrobromic acid (0.52 gram) and an additional drop of ammonium hydroxide to result in an ink with a pH of 8.21. Additional water was added to the mixture, followed by filtering, to yield 100 grams of an ink, which was then roll milled for 30 additional minutes. The ink, when coated onto glass, exhibited no crystallization. The ink was incorporated into a Hewlett-Packard DeskJet printer and prints were formed on Hammermill and Xerox Courtland paper. The prints exhibited very little feathering on the wire side of the Hammermill paper. When printed onto Xerox Courtland paper with a Hewlett-Packard DeskJet printer, the prints made with these inks exhibited excellent smear resistance (rain drop test) and excellent waterfastness of 98 to 99 percent.

EXAMPLE LVIII

An ink composition was prepared by simple mixing of ingredients comprising 60.3 grams of water, 1 gram of N,N'-bis(3-aminopropyl)-1,2-ethylenediamine (reagent grade, obtained from Aldrich Chemical Co., Milwaukee, Wis.), 15 grams of methyl urea (obtained from Aldrich), and 0.8 gram of ammonium hydroxide, followed by roll milling the mixture for 5 minutes to yield a mixture with a pH of 11.95. The pH of the mixture was then adjusted by the addition of 3.18 grams of concentrated hydrobromic acid, followed by roll milling for an additional 5 minutes, to yield a mixture with a pH of 8.96. To this mixture was added 0.3 gram of Duasyn Brilliant Red F3B SF VP 218 (high purity solid, obtained from Hoechst, Coventry, R.I.), followed by roll milling the mixture for an additional 5 minutes. Thereafter, 10.6 grams of BASF X-34 dye (obtained from BASF), 0.05 gram of polyethylene oxide (Carbowax M20, a polyethylaneoxide/bisphenol-A polymer with a molecular weight of 18,000, obtained from Union Carbide Corporation, Danbury, Conn.), and 0.1 gram of Dowicil 150 biocide (product grade, Dow Chemical Co., Midland, Mich.) were added to the mixture, followed by roll milling for 15 minutes. The resulting mixture had a pH of 8.45. The pH of the mixture was further adjusted by the addition of 3 Normal hydrobromic acid (0.52 gram) to result in an ink with a pH of 8.19. Additional water was added to the mixture, followed by filtering, to yield 100 grams of an ink, which was then roll milled for 30 additional minutes. The ink, when coated onto glass, exhibited no crystallization after 60 minutes. The ink was incorporated into a Hewlett Packard DeskJet printer and prints were formed on Hammermill and Xerox Courtland paper. The prints exhibited slight feathering on the wire side of the Hammermill paper. When printed onto Xerox Courtland paper with a Hewlett-Packard DeskJet printer, the prints made with these inks exhibited excellent smear resistance (rain drop test) and excellent waterfastness of 98 to 99 percent.

EXAMPLE LIX

An ink composition was prepared by simple mixing of ingredients comprising 56.5 grams of water, 1 gram of N,N'-bis(3-aminopropyl)-1,2-ethylenediamine (reagent grade, obtained from Aldrich Chemical Co., Milwaukee, Wis.), 20 grams of methyl urea (obtained from Aldrich), and 0.7 gram of ammonium hydroxide, followed by roll milling the mixture for 5 minutes to yield a mixture with a pH of 12.0. The pH of the mixture was then adjusted by the addition of 3.15 grams of concentrated hydrobromic acid, followed by roll milling for an additional 5 minutes, to yield a mixture with a pH of 9.0. To this mixture was added 0.3 gram of Duasyn Brilliant Red F3B SF VP 218 (high purity solid, obtained from Hoechst, Coventry, R.I.), followed by roll milling the mixture for an additional 5 minutes. Thereafter, 10.6 grams of BASF X-34 dye (obtained from BASF), 0.05 gram of polyethylene oxide (Carbowax M20, a polyethyleneoxide/bisphenol-A polymer with a molecular weight of 18,000, obtained from Union Carbide Corporation, Danbury, Conn.), and 0.1 gram of Dowicil 150 biocide (product grade, Dow Chemical Co., Midland, Mich.) were added to the mixture, followed by roll milling for 15 minutes. The resulting mixture had a pH of 8.42. The pH of the mixture was further adjusted by the addition of 3 Normal hydrobromic acid (0.52 gram) to result in an ink with a pH of 8.21. Additional water was added to the mixture, followed by filtering, to yield 100 grams of an ink, which was then roll milled for 30 additional minutes. The ink, when coated onto glass, exhibited some crystallization after 15 minutes. The ink was incorporated into a Hewlett-Packard DeskJet printer and prints were formed on Hammermill and Xerox Courtland paper. The prints exhibited slight feathering on the wire side of the Hammermill paper. When printed onto Xerox Courtland paper with a Hewlett-Packard DeskJet printer, the prints made with these inks exhibited excellent smear resistance (rain drop test) and excellent waterfastness of 98 to 99 percent.

EXAMPLE LX

An ink composition was prepared by simple mixing of ingredients comprising 64 grams of water, 1 gram of N,N'-bis(3-aminopropyl)-1,2-ethylenediamine (reagent grade, obtained from Aldrich Chemical Co., Milwaukee, Wis.), 10 grams of tetramethyl urea (obtained from Aldrich), and 0.7 gram of ammonium hydroxide, followed by roll milling the mixture for 5 minutes to yield a mixture with a pH of 11.96. The pH of the mixture was then adjusted by the addition of 2.97 grams of concentrated hydrobromic acid, followed by roll milling for an additional 5 minutes, to yield a mixture with a pH of 8.92. To this mixture was added 0.3 gram of Duasyn Brilliant Red F3B SF VP 218 (high purity solid, obtained from Hoechst, Coventry, R.I.), followed by roll milling the mixtures for an additional 5 minutes. Thereafter, 10.6 grams of BASF X-34 dye (obtained from BASF), 0.05 gram of polyethylene oxide (Carbowax M20, a polyethyleneoxide/bisphenol-A polymer with a molecular weight of 18,000, obtained from Union Carbide Corporation, Danbury, Conn.), and 0.1 gram of Dowicil 150 biocide (product grade, Dow Chemical Co., Midland, Mich.) were added to the mixture, followed by roll milling for 15 minutes. The resulting mixture had a pH of 8.35. The pH of the mixture was further adjusted by the addition of 3 Normal hydrobromic acid (0.42 gram) to result in an ink with a pH of 8.16. Additional water was added to the mixture, followed by filtering, to yield 100 grams of an ink, which was then roll milled for 30 additional minutes. The ink, when coated onto glass, exhibited no crystallization. The ink was incorporated into a Hewlett-Packard DeskJet printer and prints were formed on Hammermill and Xerox Courtland paper. The prints exhibited moderate feathering on the wire side of the Hammermill paper. When printed onto Xerox Courtland paper with a Hewlett-Packard DeskJet printer, the prints made with these inks exhibited excellent smear resistance (rain drop test) and excellent waterfastness of 98 to 99 percent.

EXAMPLE LXI

An ink composition was prepared by simple mixing of ingredients comprising 60 grams of water, 1 gram of N,N'-bis(3-aminopropyl)-1,2-ethylenediamine (reagent grade, obtained from Aldrich Chemical Co., Milwaukee, Wis.), 15 grams of tetramethyl urea (obtained from Aldrich), and 0.7 gram of ammonium hydroxide, followed by roll milling the mixture for 5 minutes to yield a mixture with a pH of 11.96. The pH of the mixture was then adjusted by the addition of 2.93 grams of concentrated hydrobromic acid, followed by roll milling for an additional 5 minutes, to yield a mixture with a pH of 9.00. To this mixture was added 0.3 gram of Duasyn Brilliant Red F3B SF VP 218 (high purity solid, obtained from Hoechst, Coventry, R.I.), followed by roll milling the mixture for an additional 5 minutes. Thereafter, 10.6 grams of BASF X-34 dye (obtained from BASF), 0.05 gram of polyethylene oxide (Carbowax M20, a polyethyleneoxide/bisphenol-A polymer with a molecular weight of 18,000, obtained from Union Carbide Corporation, Danbury, Conn.), and 0.1 gram of Dowicil 150 biocide (product grade, Dow Chemical Co., Midland, Mich.) were added to the mixture, followed by roll milling for 15 minutes. The resulting mixture had a pH of 8.49. The pH of the mixture was further adjusted by the addition of 3 Normal hydrobromic acid (0.48 gram) to result in an ink with a pH of 8.24. Additional water was added to the mixture, followed by filtering, to yield 100 grams of an ink, which was then roll milled for 30 additional minutes. The ink, when coated onto glass, exhibited no crystallization. The ink was incorporated into a Hewlett-Packard DeskJet printer and prints were formed on Hammermill and Xerox Courtland paper. The prints exhibited feathering on the wire side of the Hammermill paper. When printed onto Xerox Courtland paper with a Hewlett-Packard DeskJet printer, the prints made with these inks exhibited excellent smear resistance (rain drop test) and excellent waterfastness of 98 to 99 percent.

EXAMPLE LXII

An ink composition was prepared by simple mixing of ingredients comprising 55.3 grams of water, 1 gram of N,N'-bis(3-aminopropyl)-1,2-ethylenediamine (reagent grade, obtained from Aldrich Chemical Co., Milwaukee, Wis.), 20 grams of tetramethyl urea (obtained from Aldrich), and 0.7 gram of ammonium hydroxide, followed by roll milling the mixture for 5 minutes to yield a mixture with a pH of 12.10. The pH of the mixture was then adjusted by the addition of 2.96 grams of concentrated hydrobromic acid, followed by roll milling for an additional 5 minutes, to yield a mixture with a pH of 8.96. To this mixture was added 0.3 gram of Duasyn Brilliant Red F3B SF VP 218 (high purity solid, obtained from Hoechst, Coventry, R.I.), followed by roll milling the mixture for an additional 5 minutes. Thereafter, 10.6 grams of BASF X-34 dye (obtained from BASF), 0.05 gram of polyethylene oxide (Carbowax M20, a polyethyleneoxide/bisphenol-A polymer with a molecular weight of 18,000, obtained from Union Carbide Corporation, Danbury, Conn.), and 0.1 gram of Dowicil 150 biocide (product grade, Dow Chemical Co., Midland, Mich.) were added to the mixture, followed by roll milling for 15 minutes. The resulting mixture had a pH of 8.42. The pH of the mixture was further adjusted by the addition of 3 Normal hydrobromic acid (0.36 gram) to result in an ink with a pH of 8.235. Additional water was added to the mixture, followed by filtering, to yield 100 grams of an ink, which was then roll milled for 30 additional minutes. The ink, when coated onto glass, exhibited no crystallization. The ink was incorporated into a Hewlett-Packard DeskJet printer and prints were formed on Hammermill and Xerox Courtland paper. The prints exhibited feathering on the wire side of the Hammermill paper. When printed onto Xerox Courtland paper with a Hewlett-Packard DeskJet printer, the prints made with these inks exhibited excellent smear resistance (rain drop test) and excellent waterfastness of 98 to 99 percent.

EXAMPLE LXIII

An ink composition was prepared by simple mixing of ingredients comprising 65 grams of water, 1 gram of N,N'-bis(3-aminopropyl)-1,2-ethylenediamine (reagent grade, obtained from Aldrich Chemical Co., Milwaukee, Wis.), 10 grams of dimethyl urea (obtained from Aldrich), and 0.7 gram of ammonium hydroxide, followed by roll milling the mixture for 5 minutes to yield a mixture with a pH of 11.82. The pH of the mixture was then adjusted by the addition of 2.9 grams of concentrated hydrobromic acid, followed by roll milling for an additional 5 minutes, to yield a mixture with a pH of 9.0. To this mixture was added 0.3 gram of Duasyn Brilliant Red F3B SF VP 218 (high purity solid, obtained from Hoechst, Coventry, R.I.), followed by roll milling the mixture for an additional 5 minutes. Thereafter, 10.6 grams of BASF X-34 dye (obtained from BASF), 0.05 gram of polyethylene oxide (Carbowax M20, a polyethyleneoxide/bisphenol-A polymer with a molecular weight of 18,000, obtained from Union Carbide Corporation, Danbury, Conn.), and 0.1 gram of Dowicil 150 biocide (product grade, Dow Chemical Co., Midland, Mich.) were added to the mixture, followed by roll milling for 15 minutes. The resulting mixture had a pH of 8.47. The pH of the mixture was further adjusted by the addition of 3 Normal hydrobromic acid (0.57 gram) to result in an ink with a pH of 8.22. Additional water was added to the mixture, followed by filtering, to yield 100 grams of an ink, which was then roll milled for 30 additional minutes. The ink, when coated onto glass, exhibited no crystallization. The ink was incorporated into a Hewlett-Packard DeskJet printer and prints were formed on Hammermill and Xerox Courtland paper. The prints exhibited slight feathering on the wire side of the Hammermill paper. When printed onto Xerox Courtland paper with a Hewlett-Packard DeskJet printer, the prints made with these inks exhibited excellent smear resistance (rain drop test) and excellent waterfastness of 98 to 99 percent.

EXAMPLE LXIV

An ink composition was prepared by simple mixing of ingredients comprising 60 grams of water, 1 gram of N,N'-bis(3-aminopropyl)-1,2-ethylenediamine (reagent grade, obtained from Aldrich Chemical Co., Milwaukee, Wis.), 15 grams of dimethyl urea (obtained from Aldrich), and 0.7 gram of ammonium hydroxide, followed by roll milling the mixture for 5 minutes to yield a mixture with a pH of 11.94. The pH of the mixture was then adjusted by the addition of 2.88 grams of concentrated hydrobromic acid, followed by roll milling for an additional 5 minutes, to yield a mixture with a pH of 8.98. To this mixture was added 0.3 gram of Duasyn Brilliant Red F3B SF VP 218 (high purity solid, obtained from Hoechst, Coventry, R.I.), followed by roll milling the mixture for an additional 5 minutes. Thereafter, 10.6 grams of BASF X-34 dye (obtained from BASF), 0.05 gram of polyethylene oxide (Carbowax M20, a polyethyleneoxide/bisphenol-A polymer with a molecular weight of 18,000, obtained from Union Carbide Corporation, Danbury, Conn.), and 0.1 gram of Dowicil 150 biocide (product grade, Dow Chemical Co., Midland, Minn.) were added to the mixture, followed by roll milling for 15 minutes. The resulting mixture had a pH of 8.50. The pH of the mixture was further adjusted by the addition of 3 Normal hydrobromic acid (0.63 gram) to result in an ink with a pH of 8.20. Additional water was added to the mixture, followed by filtering, to yield 100 grams of an ink, which was then roll milled for 30 additional minutes. The ink, when coated onto glass, exhibited no crystallization after 15 minutes. The ink was incorporated into a Hewlett-Packard DeskJet printer and prints were formed on Hammermill and Xerox Courtland paper. The prints exhibited moderate feathering on the wire side of the Hammermill paper. When printed onto Xerox Courtland paper with a Hewlett-Packard DeskJet printer, the prints made with these inks exhibited excellent smear resistance (rain drop test) and excellent waterfastness of 98 to 99 percent.

EXAMPLE LXV

An ink composition was prepared by simple mixing of ingredients comprising 57 grams of water, 1 gram of N,N'-bis(3-aminopropyl)-1,2-ethylenediamine (reagent grade, obtained from Aldrich Chemical Co., Milwaukee, Wis.), 20 grams of dimethyl urea (obtained from Aldrich), and 0.7 gram of ammonium hydroxide, followed by roll milling the mixture for 5 minutes to yield a mixture with a pH of 12.08. The pH of the mixture was then adjusted by the addition of 3 grams of concentrated hydrobromic acid, followed by roll milling for an additional 5 minutes, to yield a mixture with a pH of 9.02. To this mixture was added 0.3 gram of Duasyn Brilliant Red F3B SF VP 218 (high purity solid, obtained from Hoechst, Coventry, R.I.), followed by roll milling the mixture for an additional 5 minutes. Thereafter, 10.6 grams of BASF X-34 dye (obtained from BASF), 0.05 gram of polyethylene oxide (Carbowax M20, a polyethyleneoxide/bisphenol-A polymer with a molecular weight of 18,000, obtained from Union Carbide Corporation, Danbury, Conn.), and 0.1 gram of Dowicil 150 biocide (product grade, Dow Chemical Co., Midland, Mich.) were added to the mixture, followed by roll milling for 15 minutes. The resulting mixture had a pH of 8.52. The pH of the mixture was further adjusted by the addition of 3 Normal hydrobromic acid (0.63 gram) to result in an ink with a pH of 8.215. Additional water was added to the mixture, followed by filtering, to yield 100grams of an ink, which was then roll milled for 30 additional minutes. The ink, when coated onto glass, exhibited no crystallization after 5 minutes. The ink was incorporated into a Hewlett-Packard DeskJet printer and prints were formed on Hammermill and Xerox Courtland paper. The prints exhibited feathering on the wire side of the Hammermill paper. When printed onto Xerox Courtland paper with a Hewlett-Packard DeskJet printer, the prints made with these inks exhibited excellent smear resistance (rain drop test) and excellent waterfastness of 98 to 99 percent.

EXAMPLE LXVI

An ink composition was prepared by simple mixing of ingredients comprising 55 grams of water, 1 gram of N,N'-bis(3-aminopropyl)-1,2-ethylenediamine (reagent grade, obtained from Aldrich Chemical Co., Milwaukee, Wis.), 17.5 grams of urea (obtained from Aldrich), and 0.7 gram of ammonium hydroxide, followed by roll milling the mixture for 5 minutes to yield a mixture with a pH of 12.07. The pH of the mixture was then adjusted by the addition of 3.45 grams of concentrated hydrobromic acid, followed by roll milling for an additional 5 minutes, to yield a mixture with a pH of 9.010. To this mixture was added 0.3 gram of Duasyn Brilliant Red F3B SF VP 218 (high purity solid, obtained from Hoechst, Coventry, R.I.), followed by roll milling the mixture for an additional 5 minutes. Thereafter, 10.6 grams of BASF X-34 dye (obtained from BASF), 0.05 gram of polyethylene oxide (Carbowax M20, a polyethyleneoxide/bisphenol-A polymer with a molecular weight of 18,000, obtained from Union Carbide Corporation, Danbury, Conn.), and 0.1 gram of Dowicil 150 biocide (product grade, Dow Chemical Co., Midland, Mich.) were added to the mixture, followed by roll milling for 15 minutes. The resulting mixture had a pH of 8.55. The pH of the mixture was further adjusted by the addition of 3 Normal hydrobromic acid (0.93 gram) and 3 additional drops of ammonium hydroxide to result in an ink with a pH of 8.225. Additional water was added to the mixture, followed by filtering, to yield 100 grams of an ink, which was then roll milled for 30 additional minutes. The resulting ink was stable and exhibited no crystallization. The ink was incorporated into a Hewlett-Packard DeskJet printer and prints were formed on Hammermill and Xerox Courtland paper. The prints exhibited very little feathering on the wire side of the Hammermill paper, and were of excellent waterfastness and excellent resistance to wet finger smearing. When printed onto Xerox Courtland paper with a Hewlett-Packard DeskJet printer, the prints made with these inks exhibited excellent smear resistance (rain drop test) and excellent waterfastness of 98 to 99 percent.

EXAMPLE LXVII

An ink composition was prepared by simple mixing of ingredients comprising 55 grams of water, 1 gram of N,N'-bis(3-aminopropyl)-1,2-ethylenediamine (reagent grade, obtained from Aldrich Chemical Co., Milwaukee, Wis.), 5 grams of urea (obtained from Aldrich), and 0.7 gram of ammonium hydroxide, followed by roll milling the mixture for 5 minutes to yield a mixture with a pH of 12.15. The pH of the mixture was then adjusted by the addition of 3.36 grams of concentrated hydrobromic acid, followed by roll milling for an additional 5 minutes, to yield a mixture with a pH of 8.94. To this mixture was added 0.3 gram of Duasyn Brilliant Red F3B SF VP 218 (high purity solid, obtained from Hoechst, Coventry, R.I.), followed by roll milling the mixture for an additional 5 minutes. Thereafter, 10.6 grams of BASF X-34 dye (obtained from BASF), 0.05 gram of polyethylene oxide (Carbowax M20, a polyethyleneoxide/bisphenol-A polymer with a molecular weight of 18,000, obtained from Union Carbide Corporation, Danbury, Conn.), and 0.1 gram of Dowicil 150 biocide (product grade, Dow Chemical Co., Midland, Mich.) were added to the mixture, followed by roll milling for 15 minutes. The resulting mixture had a pH of 8.425. The pH of the mixture was further adjusted by the addition of 3 Normal hydrobromic acid (0.44 gram) to result in an ink with a pH of 8.191. Additional water was added to the mixture, followed by filtering, to yield 100 grams of an ink, which was then roll milled for 30 additional minutes. The resulting ink was stable and exhibited no crystallization. The ink was incorporated into a Hewlett-Packard DeskJet printer and prints were formed on Hammermill and Xerox Courtland paper. The prints exhibited very little feathering on the wire side of the Hammermill paper, and were of excellent waterfastness and excellent resistance to wet finger smearing. When printed onto Xerox Courtland paper with a Hewlett-Packard DeskJet printer, the prints made with these inks exhibited excellent smear resistance (rain drop test) and excellent waterfastness of 98 to 99 percent.

EXAMPLE LXVIII

An ink composition was prepared by simple mixing of ingredients comprising 58.5 grams of water, 1 gram of N,N'-bis(3-aminopropyl)-1,2-ethylenediamine (reagent grade, obtained from Aldrich Chemical Co., Milwaukee, Wis.), 15 grams of urea (obtained from Aldrich), and 0.7 gram of ammonium hydroxide, followed by roll milling the mixture for 5 minutes to yield a mixture with a pH of 12.13. The pH of the mixture was then adjusted by the addition of 3.36 grams of concentrated hydrobromic acid, followed by roll milling for an additional 5 minutes, to yield a mixture with a pH of 8.91. To this mixture was added 0.3 gram of Duasyn Brilliant Red F3B SF VP 218 (high purity solid, obtained from Hoechst, Coventry, R.I.), followed by roll milling the mixture for an additional 5 minutes. Thereafter, 10.6 grams of BASF X-34 dye (obtained from BASF), 0.05 gram of polyethylene oxide (Carbowax M20, a polyethyleneoxide/bisphenol-A polymer with a molecular weight of 18,000, obtained from Union Carbide Corporation, Danbury, Conn.), and 0.1 gram of Dowicil 150 biocide (product grade, Dow Chemical Co., Midland, Mich.) were added to the mixture, followed by roll milling for 15 minutes. The resulting mixture had a pH of 8.393. The pH of the mixture was further adjusted by the addition of 3 Normal hydrobromic acid (0.48 gram) to result in an ink with a pH of 8.205. Additional water was added to the mixture, followed by filtering, to yield 100 grams of an ink, which was then roll milled for 30 additional minutes. The resulting ink was stable. The ink was incorporated into a Hewlett-Packard DeskJet printer and prints were formed on Hammermill and Xerox Courtland paper. The prints exhibited very little feathering on the wire side of the Hammermill paper, and were of excellent waterfastness and excellent resistance to wet finger smearing. When jetted onto glass, the ink crystallized when drying. When printed onto Xerox Courtland paper with a Hewlett-Packard DeskJet printer, the prints made with these inks exhibited excellent smear resistance (rain drop test) and excellent waterfastness of 98 to 99 percent.

EXAMPLE LXIX

An ink composition was prepared by simple mixing of ingredients comprising 55 grams of water, 1 gram of N,N'-bis(3-aminopropyl)-1,2-ethylenediamine (reagent grade, obtained from Aldrich Chemical Co., Milwaukee, Wis.), 10 grams of urea (obtained from Aldrich), and 0.7 gram of ammonium hydroxide, followed by roll milling the mixture for 5 minutes to yield a mixture with a pH of 12.15. The pH of the mixture was then adjusted by the addition of 3.28 grams of concentrated hydrobromic acid, followed by roll milling for an additional 5 minutes, to yield a mixture with a pH of 8.98. To this mixture was added 10 grams of dipropylene glycol and 0.3 gram of Duasyn Brilliant Red F3B SF VP 218 (high purity solid, obtained from Hoechst, Coventry, R.I.), followed by roll milling the mixture for an additional 5 minutes. Thereafter, 10.6 grams of BASF X-34 dye (obtained from BASF) and 0.05 gram of polyethylene oxide (Carbowax M20, a polyethyloneoxide/bisphenol A polymer with a molecular weight of 18,000, obtained from Union Carbide Corporation, Danbury, Conn.) were added to the mixture, followed by roll milling for 15 minutes. The resulting mixture had a pH of 8.39. The pH of the mixture was further adjusted by the addition of 3 Normal hydrobromic acid (0.44 gram) to result in an ink with a pH of 8.204. Additional water was added to the mixture, followed by filtering, to yield 100 grams of an ink, which was then roll milled for 30 additional minutes. The resulting ink was stable. The ink was incorporated into a Hewlett-Packard DeskJet printer and prints were formed on Hammermill and Xerox Courtland paper. The prints exhibited feathering on the wire side of the Hammermill paper, and were of excellent waterfastness and excellent resistance to wet finger smearing. When jetted onto glass, the ink exhibited no crystallization after 30 minutes. When printed onto Xerox Courtland paper with a Hewlett-Packard DeskJet printer, the prints made with these inks exhibited excellent smear resistance (rain drop test) and excellent waterfastness of 98 to 99 percent.

EXAMPLE LXX

An ink composition was prepared by simple mixing of ingredients comprising 56 grams of water, 1 gram of N,N'-bis(3-aminopropyl)-1,2-ethylenediamine (reagent grade, obtained from Aldrich Chemical Co., Milwaukee, Wis.), 10 grams of urea (obtained from Aldrich), and 0.7 gram of ammonium hydroxide, followed by roll milling the mixture for 5 minutes to yield a mixture with a pH of 12.20. The pH of the mixture was then adjusted by the addition of 3.32 grams of concentrated hydrobromic acid, followed by roll milling for an additional 5 minutes, to yield a mixture with a pH of 9.00. To this mixture was added 15 grams of ethylene glycol and 0.3 gram of Duasyn Brilliant Red F3B SF VP 218 (high purity solid, obtained from Hoechst, Coventry, R.I.), followed by roll milling the mixture for an additional 5 minutes. Thereafter, 10.6 grams of BASF X-34 dye (obtained from BASF) and 0.05 gram of polyethylene oxide (Carbowax M20, a polyethyleneoxide/bisphenol-A polymer with a molecular weight of 18,000, obtained from Union Carbide Corporation, Danbury, Conn.) were added to the mixture, followed by roll milling for 15 minutes. The resulting mixture had a pH of 8.425. The pH of the mixture was further adjusted by the addition of 3 Normal hydrobromic acid (0.54 gram) to result in an ink with a pH of 8.215. Additional water was added to the mixture, followed by filtering, to yield 100 grams of an ink, which was then roll milled for 30 additional minutes. The resulting ink was stable. The ink was incorporated into a Hewlett-Packard DeskJet printer and prints were formed on Hammermill and Xerox Courtland paper. The prints were of excellent waterfastness and excellent resistance to wet finger smearing. When jetted onto glass, the ink exhibited no crystallization. When printed onto Xerox Courtland paper with a Hewlett-Packard DeskJet printer, the prints made with these inks exhibited excellent smear resistance (rain drop test) and excellent waterfastness of 98 to 99 percent.

EXAMPLE LXXI

An ink composition was prepared by simple mixing of ingredients comprising 60 grams of water, 1 gram of N,N'-bis(3-aminopropyl)-1,2-ethylenediamine (reagent grade, obtained from Aldrich Chemical Co., Milwaukee, Wis.), 10 grams of urea (obtained from Aldrich), and 0.7 gram of ammonium hydroxide, followed by roll milling the mixture for 5 minutes to yield a mixture with a pH of 12.07. The pH of the mixture was then adjusted by the addition of 2.1 grams of concentrated hydrochloric acid, followed by roll milling for an additional 5 minutes, to yield a mixture with a pH of 8.97. To this mixture was added 0.3 gram of Duasyn Brilliant Red F3B SF VP 218 (high purity solid, obtained from Hoechst, Coventry, R.I.), followed by roll milling the mixture for an additional 5 minutes. Thereafter, 10.6 grams of BASF X-34 dye (obtained from BASF) and 0.05 gram of polyethylene oxide (Carbowax M20, a polyethyleneoxide/bisphenol-A polymer with a molecular weight of 18,000, obtained from Union Carbide Corporation, Danbury, Conn.) were added to the mixture, followed by roll milling for 15 minutes. The resulting mixture had a pH of 8.42. The pH of the mixture was further adjusted by the addition of 3 Normal hydrochloric acid (0.4 gram) to result in an ink with a pH of 8.19. Additional water was added to the mixture, followed by filtering, to yield 100 grams of an ink, which was then roll milled for 30 additional minutes. The resulting ink was stable and exhibited no crystallization. The ink was incorporated into a Hewlett-Packard DeskJet printer and prints were formed on Hammermill and Xerox Courtland paper. The prints were of excellent waterfastness and excellent resistance to wet finger smearing. The ink had a viscosity of 1.24 centipoise, a surface tension of 51.4 dynes per centimeter, and a conductivity of 21.8 mohs per centimeter. When printed onto Xerox Courtland paper with a Hewlett-Packard DeskJet printer, the prints made with these inks exhibited excellent smear resistance (rain drop test) and excellent waterfastness of 98 to 99 percent.

EXAMPLE LXXII

An ink composition was prepared by simple mixing of ingredients comprising 56 grams of water, 1 gram of N,N'-bis(3-aminopropyl)-1,2-ethylenediamine (reagent grade, obtained from Aldrich Chemical Co., Milwaukee, Wis.), 10 grams of urea (obtained from Aldrich), and 0.7 gram of ammonium hydroxide, followed by roll milling the mixture for 5 minutes to yield a mixture with a pH of 12.13. The pH of the mixture was then adjusted by the addition of 2.04 grams of concentrated hydrochloric acid, followed by roll milling for an additional 5 minutes, to yield a mixture with a pH of 8.94. To this mixture was added 5 grams of dipropylene glycol and 0.3 gram pof Duasyn Brilliant Red F3B SF VP 218 (high purity solid, obtained from Hoechst, Coventry, R.I.), followed by roll milling the mixture for an additional 5 minutes. Thereafter, 10.6 grams of BASF X-34 dye (obtained from BASF) and 0.05 gram of polyethylene oxide (Carbowax M20, a polyethyleneoxide/bisphenol-A polymer with a molecular weight of 18,000, obtained from Union Carbide Corporation, Danbury, Conn.) were added to the mixture, followed by roll milling for 15 minutes. The resulting mixture had a pH of 8.28. The pH of the mixture was further adjusted by the addition of 3 Normal hydrochloric acid (0.15 gram) to result in an ink with a pH of 8.17. Additional water was added to the mixture, followed by filtering, to yield 100 grams of an ink, which was then roll milled for 30 additional minutes. The resulting ink was stable and exhibited no crystallization. The ink was incorporated into a Hewlett-Packard DeskJet printer and prints were formed on Hammermill and Xerox Courtland paper. The prints were of excellent waterfastness and excellent resistance to wet finger smearing. The ink had a viscosity of 1.52 centipoise, a surface tension of 52.2 dynes per centimeter, and a conductivity of 17.6 mohs per centimeter. When printed onto Xerox Courtland paper with a Hewlett-Packard DeskJet printer, the prints made with these inks exhibited excellent smear resistance (rain drop test) and excellent waterfastness of 98 to 99 percent.

EXAMPLE LXXIII

An ink composition was prepared by simple mixing of ingredients comprising 60 grams of water, 1 gram of N,N'-bis(3-aminopropyl)-1,2-ethylenediamine (reagent grade, obtained from Aldrich Chemical Co., Milwaukee, Wis.), 10 grams of urea (obtained from Aldrich), and 0.7 gram of ammonium hydroxide, followed by roll milling the mixture for 5 minutes to yield a mixture with a pH of 11.94. The pH of the mixture was then adjusted by the addition of 3.29 grams of concentrated hydrobromic acid, followed by roll milling for an additional 5 minutes, to yield a mixture with a pH of 8.99. To this mixture was added 0.3 gram of Duasyn Brilliant Red F3B SF VP 218 (high purity solid, obtained from Hoechst, Coventry, R.I.), followed by roll milling the mixture for an additional 5 minutes. Thereafter, 10.6 grams of BASF X-34 dye (obtained from BASF) and 0.06 gram of polyethylene oxide (Carbowax M20, a polyethyleneoxide/bisphenol-A polymer with a molecular weight of 18,000, obtained from Union Carbide Corporation, Danbury, Conn.) were added to the mixture, followed by roll milling for 15 minutes. The resulting mixture had a pH of 8.47. The pH of the mixture was further adjusted by the addition of 3 Normal hydrobromic acid (0.15 gram) to result in an ink with a pH of 8.17. Additional water was added to the mixture, followed by filtering, to yield 100 grams of an ink, which was then roll milled for 30 additional minutes. The resulting ink was stable and exhibited no crystallization. The ink was incorporated into a Hewlett-Packard DeskJet printer and prints were formed on Hammermill and Xerox Courtland paper. The prints were of excellent waterfastness and excellent resistance to wet finger smearing. The ink had a viscosity of 1.26 centipoise, a surface tension of 54.0 dynes per centimeter, and a conductivity of 20.9 mohs per centimeter. When printed onto Xerox Courtland paper with a Hewlett-Packard DeskJet printer, the prints made with these inks exhibited excellent smear resistance (rain drop test) and excellent waterfastness of 98 to 99 percent.

EXAMPLE LXXIV

An ink composition was prepared by simple mixing of ingredients comprising 55 grams of water, 1 gram of N,N'-bis(3-aminopropyl)-1,2-ethylenediamine (reagent grade, obtained from Aldrich Chemical Co., Milwaukee, Wis.), 10 grams of urea (obtained from Aldrich), and 0.7 gram of ammonium hydroxide, followed by roll milling the mixture for 5 minutes to yield a mixture with a pH of 12.06. The pH of the mixture was then adjusted by the addition of 3.2 grams of concentrated hydrobromic acid, followed by roll milling for an additional 5 minutes, to yield a mixture with a pH of 9.00. To this mixture was added 5 grams of dipropylene glycol and 0.3 gram of Duasyn Brilliant Red F3B SF VP218 (high purity solid, obtained from Hoechst, Coventry, R.I.) followed by roll milling the mixture for an additional 5 minutes. Thereafter, 10.6 grams of BASF X-34 dye (obtained from BASF) and 0.06 gram of polyethylene oxide (Carbowax M20, a polyethyleneoxide/bisphenol-A polymer with a molecular weight of 18,000, obtained from Union Carbide Corporation, Danbury, Conn.) were added to the mixture, followed by roll milling for 15 minutes. The resulting mixture had a pH of 8.44. The pH of the mixture was further adjusted by the addition of 3 Normal hydrobromic acid (0.56 gram) to result in an ink with a pH of 8.205. Additional water was added to the mixture, followed by filtering, to yield 100 grams of an ink, which was then roll milled for 30 additional minutes. The resulting ink was stable and exhibited no crystallization. The ink was incorporated into a Hewlett-Packard DeskJet printer and prints were formed on Hammermill and Xerox Courtland paper. The prints were of excellent waterfastness and excellent resistance to wet finger smearing. The ink had a viscosity of 1.53 centipoise, a surface tension of 51.9 dynes per centimeter, and a conductivity of 17.6 mohs per centimeter. When printed onto Xerox Courtland paper with a Hewlett-Packard DeskJet printer, the prints made with these inks exhibited excellent smear resistance (rain drop test) and excellent waterfastness of 98 to 99 percent.

EXAMPLE LXXV

An ink composition was prepared by simple mixing of ingredients comprising 51.5 grams of water, 1 gram of N,N'-bis(3-aminopropyl)-1,2-ethylenediamine (reagent grade, obtained from Aldrich Chemical Co., Milwaukee, Wis.), 20 grams of urea (obtained from Aldrich), and 0.7 gram of ammonium hydroxide, followed by roll milling the mixture for 5 minutes to yield a mixture with a pH of 12.0. The pH of the mixture was then adjusted by the addition of 4 grams of 3 normal hydrochloric acid, followed by roll milling for an additional 5 minutes, to yield a mixture with a pH of 8.971. To this mixture was added 0.3 gram of Duasyn Brilliant Red F3B SF VP 218 (high purity solid, obtained from Hoechst, Coventry, R.I.), followed by roll milling the mixture for an additional 5 minutes. Thereafter, 10.6 grams of BASF X-34 dye (obtained from BASF) and 0.06 gram of polyethylene oxide (Carbowax M20, a polyethyleneoxide/bisphenol-A polymer with a molecular weight of 18,000, obtained from Union Carbide Corporation, Danbury, Conn.) were added to the mixture, followed by roll milling for 15 minutes. The resulting mixture had a pH of 8.38. The pH of the mixture was further adjusted by the addition of 3 Normal hydrochloric acid (0.18 gram) to result in an ink with a pH of 8.219. Additional water was added to the mixture, followed by filtering, to yield 100 grams of an ink, which was then roll milled for 30 additional minutes. The resulting ink was stable and exhibited no crystallization. The ink was incorporated into a Hewlett-Packard DeskJet printer and prints were formed on Hammermill Xerox Courtland paper. The prints were of excellent waterfastness and excellent resistance to wet finger smearing. The ink had a conductivity of 19.1 mohs per centimeter, and the printer demonstrated excellent recovery after the ink was left in the printer for 16 hours, uncapped and without front face wipe or suction. When printed onto Xerox Courtland paper with a Hewlett-Packard DeskJet printer, the prints made with these inks exhibited excellent smear resistance (rain drop test) and excellent waterfastness of 98 to 99 percent.

EXAMPLE LXXVI

An ink composition was prepared by simple mixing of ingredients comprising 40.5 grams of water, 1 gram of N,N'-bis(3-aminopropyl)-1,2-ethylenediamine (reagent grade, obtained from Aldrich Chemical Co., Milwaukee, Wis.), 20 grams of urea (obtained from Aldrich), and 0.7 gram of ammonium hydroxide, followed by roll milling the mixture for 5 minutes to yield a mixture with a pH of 12.54. The pH of the mixture was then adjusted by the addition of 3.84 grams of 3 Normal hydrochloric acid, followed by roll milling for an additional 5 minutes, to yield a mixture with a pH of 9.00. To this mixture was added 15 grams of ethylene glycol and 0.3 gram of Duasyn Brilliant Red F3B SF VP 218 (high purity solid, obtained from Hoechst, Coventry, R.I.), followed by roll milling the mixture for an additional 5 minutes. Thereafter, 10.6 grams of BASF X-34 dye (obtained from BASF) and 0.05 gram of polyethylene oxide (Carbowax M20, a polyethyleneoxide/bisphenol-A polymer with a molecular weight of 18,000, obtained from Union Carbide Corporation, Danbury, Conn.) were added to the mixture, followed by roll milling for 15 minutes. The resulting mixture had a pH of 8.27. The pH of the mixture was further adjusted by the addition of 3 Normal hydrochloric acid (0.18 gram) to result in an ink with a pH of 8.155. Additional water was added to the mixture, followed by filtering, to yield 100 grams of an ink, which was then roll milled for 30 additional minutes. The resulting ink was stable and exhibited no crystallization. The ink was incorporated into a Hewlett-Packard DeskJet printer and prints were formed on Hammermill and Xerox Courtland paper. The prints were of excellent waterfastness and excellent resistance to wet finger smearing. The ink had a conductivity of 12.6 mohs per centimeter, and the printer demonstrated excellent recovery after the ink was left in the printer for 16 hours, uncapped and without front face wipe or suction. When printed onto Xerox Courtland paper with a Hewlett-Packard DeskJet printer, the prints made with these inks exhibited excellent smear resistance (rain drop test) and excellent waterfastness of 98 to 99 percent.

EXAMPLE LXXVII

An ink composition was prepared by simple mixing of ingredients comprising 67 grams of water, 1 gram of N,N'-bis(3-aminopropyl)-1,2-ethylenediamine (reagent grade, obtained from Aldrich Chemical Co., Milwaukee, Wis.), 20 grams of urea (obtained from Aldrich), and 0.7 gram of ammonium hydroxide, followed by roll milling the mixture for 5 minutes to yield a mixture with a pH of 12.2. The pH of the mixture was then adjusted by the addition of 3.84 grams of concentrated hydrobromic acid, followed by roll milling for an additional 5 minutes, to yield a mixture with a pH of 9.05. To this mixture was added 0.3 gram of Duasyn Brilliant Red F3B SF VP 218 (high purity solid, obtained from Hoechst, Coventry, R.I.), followed by roll milling the mixture for an additional 5 minutes. Thereafter, 10.6 grams of BASF X-34 dye (obtained from BASF) was added to the mixture. The resulting mixture had a pH of 8.44. The pH of the mixture was further adjusted by the addition of 3 Normal hydrobromic acid (0.58 gram) to result in an ink with a pH of 8.22. Thereafter, 0.05 gram of polyethylene oxide (Carbowax M20, a polyethyleneoxide/bisphenol-A polymer with a molecular weight of 18,000, obtained from Union Carbide Corporation, Danbury, Conn.) was added to the ink, followed by roll milling for 5 minutes. The ink was then filtered and roll milled for 120 additional minutes. The resulting ink was stable and exhibited no crystallization. The ink was incorporated into a Hewlett-Packard DeskJet printer and prints were formed on Hammermill and Xerox Courtland paper. The prints were of excellent waterfastness and excellent resistance to wet finger smearing. The printer demonstrated excellent recovery after the ink was left in the printer for 16 hours, uncapped and without front face wipe or suction. When printed onto Xerox Courtland paper with a Hewlett-Packard DeskJet printer, the prints made with these inks exhibited excellent smear resistance (rain drop text) and excellent waterfastness of 98 to 99 percent.

EXAMPLE LXXVIII

An ink composition was prepared by simple mixing of ingredients comprising 61 grams of water, 1 gram of N,N'-bis(3-aminopropyl)-1,2-ethylenediamine (reagent grade, obtained from Aldrich Chemical Co., Milwaukee, Wis.), 20 grams of urea (obtained from Aldrich), and 0.75 gram of ammonium hydroxide, followed by roll milling the mixture for 5 minutes to yield a mixture with a pH of 12.2. The pH of the mixture was then adjusted by the addition of 3.26 grams of concentrated hydrobromic acid, followed by roll milling for an additional 5 minutes, to yield a mixture with a pH of 9.05. To this mixture was added 0.3 gram of Duasyn Brilliant Red F3B SF VP 218 (high purity solid, obtained from Hoechst, Coventry, R.I.) and 15 grams of ethylene glycol, followed by roll milling the mixture for an additional 5 minutes. Thereafter, 10.6 grams of BASF X-34 dye (obtained from BASF) was added to the mixture. The resulting mixture had a pH of 8.44. The pH of the mixture was further adjusted by the addition of 3 Normal hydrobromic acid (0.58 gram) to result in an ink with a pH of 8.23. Thereafter, 0.06 gram of polyethylene oxide (Carbowax M20, a polyethyleneoxide/bisphenol-A polymer with a molecular weight of 18,000, obtained from Union Carbide Corporation, Danbury, Conn.) was added to the ink, followed by roll milling for 5 minutes. The ink was then filetered and roll milled for 30 additional minutes. The resulting ink was stable and exhibited no crystallization. The ink was incorporated into a Hewlett-Packard DeskJet printer and prints were formed on Hammermill and Xerox Courtland paper. The prints were of excellent waterfastness and excellent resistance to wet finger smearing. The printer demonstrated excellent recovery after the ink was left in the printer for 16 hours, uncapped and without front face wipe or suction. When printed onto Xerox Courtland paper with a Hewlett-Packard DeskJet printer, the prints made with these inks exhibited excellent smear resistance (rain drop test) and excellent waterfastness of 98 to 99 percent.

EXAMPLE LXXIX

An ink composition was prepared by simple mixing of ingredients comprising 60 grams of water, 1 gram of N,N'-bis(3-aminopropyl)-1,2-ethylenediamine (reagent grade, obtained from Aldrich Chemical Co., Milwaukee, Wis.), 10 grams of urea (obtained from Aldrich), and 0.7 gram of ammonium hydroxide, followed by roll milling the mixture for 5 minutes to yield a mixture with a pH of 11.5. The pH of the mixture was then adjusted by the addition of 6.5 grams of 3 Normal hydrobromic acid, followed by roll milling for an additional 5 minutes, to yield a mixture with a pH of 9.0. To this mixture was added 4.0 grams of sulfolane (obtained from Phillips) and 3.0 grams of N-methyl pyrrolidone (obtained from BASF), followed by roll milling the mixture for an additional 5 minutes. To this mixture was added 0.3 gram of Duasyn Brilliant Red F3B SF VP 218 (high purity solid, obtained from Hoechst, Coventry, R.I.), followed by roll milling the mixture for an additional 5 minutes. Thereafter, 10.6 grams of BASF X-34 dye (obtained from BASF) was added to the mixture. The resulting mixture had a pH of 8.4. The pH of the mixture was further adjusted by the addition of 3 Normal hydrobromic acid (0.73 gram) to result in an ink with a pH of 8.195. The ink was again roll milled for 5 minutes. Additional water was added to the mixture, followed by filtering, to yield 100 grams of an ink, which was then roll milled for 15 additional minutes. The resulting ink was stable. The ink was incorporated into a Hewlett-Packard DeskJet printer and prints were formed on Hammermill and Xerox Courtland paper. The prints were of excellent waterfastness and excellent resistance to wet finger smearing. The printer demonstrated excellent recovery after the ink was left in the printer for 24 hours, uncapped and without front face wipe or suction. After the printer was left idle for 5 days, recoverability of the printer was complete after one half of a page was printed, and the printer exhibited no front face weeping of the ink during this time. When printed onto Xerox Courtland paper with a Hewlett-Packard DeskJet printer, the prints made with these inks exhibited excellent smear resistance (rain drop test) and excellent waterfastness of 98 to 99 percent.

EXAMPLE LXXX

An ink composition was prepared by simple mixing of ingredients comprising 50 grams of water, 1 gram of N,N'-bis(3-aminopropyl)-1,2-ethylenediamine (reagent grade, obtained from Aldrich Chemical Co., Milwaukee, Wis.), 20 grams of urea (obtained from Aldrich), and 0.7 gram of ammonium hydroxide, followed by roll milling the mixture for 5 minutes to yield a mixture with a pH of 12.35. The pH of the mixture was then adjusted by the addition of 6.7 grams of 3 Normal hydrobromic acid, followed by roll milling for an additional 5 minutes, to yield a mixture with a pH of 9.0. To this mixture was added 4.0 grams of sulfolane (obtained from Phillips) and 3.0 grams of N-methyl pyrrolidone (obtained from BASF), followed by roll milling the mixture for an additional 5 minutes. To this mixture was added 0.3 gram of Duasyn Brilliant Red F3B SF VP 218 (high purity solid, obtained from Hoechst, Coventry, R.I.), followed by roll milling the mixture for an additional 5 minutes. Thereafter, 10.6 grams of BASF X-34 dye (obtained from BASF) was added to the mixture. The resulting mixture had a pH of 8.5. The pH of the mixture was further adjusted by the addition of 3 Normal hydrobromic acid (0.79 gram) to result in an ink with a pH of 8.19. The ink was again roll milled for 5 minutes. Additional water was added to the mixture, followed by filtering, to yield 100 grams of an ink, which was then roll milled for 15 additional minutes. The resulting ink was stable. The ink was incorporated into a Hewlett-Packard DeskJet printer and prints were formed on Hammermill and Xerox Courtland paper. The prints were of excellent waterfastness and excellent resistance to wet finger smearing. The printer demonstrated excellent recovery after the ink was left in the printer for 24 hours, uncapped and without front face wipe or suction. After the printer was left idle for 5 days, excellent recoverability was also observed. The printer exhibited front face weeping of the ink during the five day period of idleness but no front face weeping of the ink during the first day of idleness. When printed onto Xerox Courtland paper with a Hewlett-Packard DeskJet printer, the prints made with these inks exhibited excellent smear resistance (rain drop test) and excellent waterfastness of 98 to 99 percent.

EXAMPLE LXXXI

An ink composition was prepared by simple mixing of ingredients comprising 40 grams of water, 1 gram of N,N'-bis(3-aminopropyl)-1,2-ethylenediamine (reagent grade, obtained from Aldrich Chemical Co., Milwaukee, Wis.), 30 grams of urea (obtained from Aldrich), and 0.7 gram of ammonium hydroxide, followed by roll milling the mixture for 5 minutes to yield a mixture with a pH of 12.5. The pH of the mixture was then adjusted by the addition of 6.7 grams of 3 Normal hydrobromic acid, followed by roll milling for an additional 5 minutes, to yield a mixture with a pH of 9.0. To this mixture was added 4.0 grams of sulfolane (obtained from Phillips) and 3.0 grams of N-methyl pyrrolidone (obtained from BASF), followed by roll milling the mixture for an additional 5 minutes. To this mixture was added 0.3 gram of Duasyn Brilliant Red F3B SF VP 218 (high purity solid, obtained from Hoechst, Coventry, R.I.), followed by roll milling the mixture for an additional 5 minutes. Thereafter, 10.6 grams of BASF X-34 dye (obtained from BASF) was added to the mixture. The resulting mixture had a pH of 8.5. The pH of the mixture was further adjusted by the addition of 3 Normal hydrobromic acid (0.77 gram) to result in an ink with a pH of 8.17. The ink was again roll milled for 5 minutes. Additional water was added to the mixture, followed by filtering, to yield 100 grams of an ink, which was then roll milled for 15 additional minutes. The resulting ink was stable. The ink was incorporated into a Hewlett-Packard DeskJet printer and prints were formed on Hammermill and Xerox Courtland paper. The prints were of excellent waterfastness and excellent resistance to wet finger smearing. The printer demonstrated excellent recovery after the ink was left in the printer for 24 hours, uncapped and without front face wipe or suction. After the printer was left idle for 5 days, excellent recoverability was also observed. The printer exhibited some front face weeping of the ink during the first day of idleness. When printed onto Xerox Courtland paper with a Hewlett-Packard DeskJet printer, the prints made with these inks exhibited excellent smear resistance (rain drop test) and excellent waterfastness of 98 to 99 percent.

EXAMPLE LXXXII

An ink composition was prepared by simple mixing of ingredients comprising 30 grams of water, 1 gram of N,N'-bis(3-aminopropyl)-1,2-ethylenediamine (reagent grade, obtained from Aldrich Chemical Co., Milwaukee, Wis.), 40 grams of urea (obtained from Aldrich), and 0.7 gram of ammonium hydroxide, followed by roll milling the mixture for 5 minutes to yield a mixture with a pH of 12.5. The pH of the mixture was then adjusted by the addition of 6.66 grams of 3 Normal hydrobromic acid, followed by roll milling for an additional 5 minutes, to yield a mixture with a pH of 9.1. To this mixture was added 4.0 grams of sulfolane (obtained from Phillips) and 3.0 grams of N-methyl pyrrolidone (obtained from BASF), followed by roll milling the mixture for an additional 5 minutes. To this mixture was added 0.3 gram of Duasyn Brilliant Red F3B SF VP 218 (high purity solid, obtained from Hoechst, Coventry, R.I.), followed by roll milling the mixture for an additional 5 minutes. Thereafter, 10.6 grams of BASF X-34 dye (obtained from BASF) was added to the mixture. The resulting mixture had a pH of 8.5. The pH of the mixture was further adjusted by the addition of 3 Normal hydrobromic acid (1.02 gram) to result in an ink with a pH of 8.17. The ink was again roll milled for 5 minutes. Additional water was added to the mixture, followed by filtering, to yield 100 grams of an ink, which was then roll milled for 15 additional minutes. The resulting ink was stable. The ink was incorporated into a Hewlett-Packard DeskJet printer and prints were formed on Hammermill and Xerox Courtland paper. The prints were of excellent waterfastness and excellent resistance to wet finger smearing. The printer demonstrated excellent recovery after the ink was left in the printer for 24 hours, uncapped and without front face wipe or suction. After the printer was left idle for 5 days, excellent recoverability was also observed. The printer exhibited some front face weeping of the ink during the first day of idleness. When printed onto Xerox Courtland paper with a Hewlett-Packard DeskJet printer, the prints made with these inks exhibited excellent smear resistance (rain drop test) and excellent waterfastness of 98 to 99 percent.

EXAMPLE LXXXIII

An ink composition was prepared by simple mixing of ingredients comprising 71.45 percent by weight water, 3 percent by weight C.I. Food Black #2 (Bayscript Black CA 51071, obtained from Bayer (Canada) Inc., Pointe Claire, PQ), 20 percent by weight ethylene glycol (obtained from Aldrich Chemical Co., Milwaukee, Wis.), 3.5 percent by weight isopropanol (obtained from Caledon Laboratories Ltd., Georgetown, ON), 0.05 percent by weight polyethylene oxide (MW 18,500, obtained from Polysciences, Inc., Warrington, Pa.), and 2 percent by weight tetraethylenepentamine (obtained from Aldrich Chemical Co., Milwaukee, Wis.) to yield a mixture of pH=10.84. The pH was lowered to 8.5 by the addition of 1.4 milliliters of 3 Molar hydrochloric acid (reagent grade, obtained from Aldrich Chemical Co., Milwaukee, Wis.) to yield a precipitate free ink with a residual waterfastness on Nekoosa Ardor paper (felt side) of 80 percent with the visible filter.

EXAMPLE LXXXIV

An ink composition was prepared by simple mixing of ingredients comprising 3.45 percent by weight Basacid Black X-34 (water soluble black dye obtained from BASF), 9.5 percent by weight sulfolane, 6.9 percent by weight 2-pyrrolidinone, 0.03 percent by weight polyethylene oxide (MW 18,500, obtained from Polysciences, Inc., Warrington, Pa.), 86.02 percent by weight deionized water, and 1.0 percent by weight ethylenediamine. The pH of this ink was adjusted to 8.1 by the addition of concentrated hydrochloric acid. The ink exhibited a surface tension of 53.2 milliNewtons per meter and a viscosity of 1.74 centipoise. Subsequently the ink was incorporated into a Hewlett-Packard DeskJet printer and jetted onto several plain papers (Hammermill Fore DP, Nekoosa Ardor, Champion Datacopy, Classic Crest). The prints thus generated were measured for optical density before and after soaking of the image in water for two minutes, with the result that optical density of the generated prints ranged from 84 to 88 percent.

EXAMPLE LXXXV

Five ink compositions are prepared as described in Example LXXXIV, except that diethylenetriamine, triethylenetetramine, TEXLIN 300, TEXLIN 400, and TEXLIN 500 are substituted, respectively, for ethylenediamine. It is believed that the inks thus prepared will exhibit waterfastness values of at least 80 to 90 percent when jetted onto plain paper.

EXAMPLE LXXXVI

Five ink compositions are prepared by simple mixing of ingredients comprising 20 percent by weight ethylene glycol, 3.5 percent by weight isopropanol, 0.05 percent by weight polyethylene oxide (MW 18,500), 3.45 percent by weight Basacid Black X-34 dye, from 1 to 3 percent by weight tetraethylenepentamine, and the balance deionized water to make up 100 percent. The pH values of the inks are adjusted to the desired level by addition of concentrated hydrochloric acid. It is believed that when these inks are jetted onto plain papers, desirably waterfast images will be generated.

Other embodiments and modifications of the present invention may occur to those skilled in the art subsequent to a review of the information presented herein, these embodiments and modifications, as well as equivalents thereof, are also included within the scope of this invention.

What is claimed is:

1. An ink composition which comprises water, a dye, and N,N'-bis(3-aminopropyl)-1,2-ethylenediamine.

2. An ink composition according to claim 1 wherein the ink also contains sulfolane and a material selected from the group consisting of 2-pyrrolidinone and N-methyl pyrrolidone.

3. An ink composition according to claim 1 wherein the ink also contains a urea.

4. An ink composition according to claim 3 wherein the ink also contains a glycol.

5. An ink composition according to claim 1 wherein the dye is an anionic dye.

6. An ink composition according to claim 1 wherein the dye is selected from the group consisting of

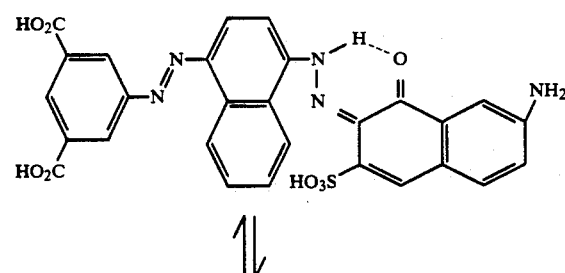

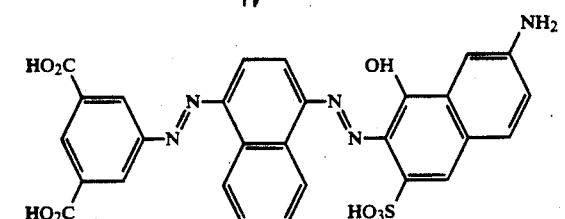

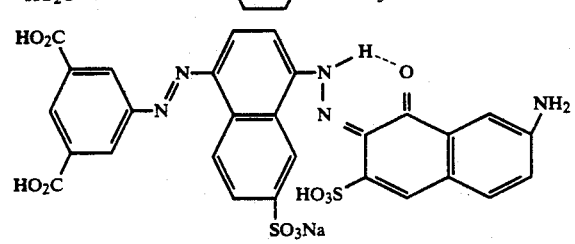

-continued

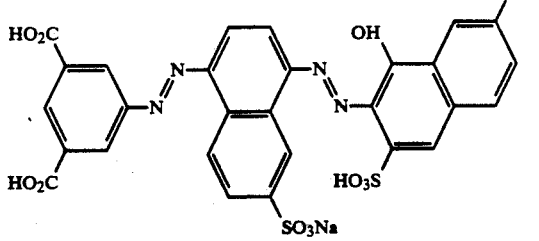

and mixtures thereof.

7. An ink composition according to claim 1 wherein the polyamine compound is present in an amount of from about 0.05 to about 5 percent by weight of the ink.

8. An ink composition according to claim 1 wherein the pH of the ink is from about 7 to about 10.

9. An ink composition according to claim 1 wherein the pH of the ink is more than 8 and less than 9.

10. An ink composition which comprises water, a dye, a polyamine compound selected from the group consisting of N,N'-bis(3-aminopropyl)-1,2-ethylenediamine, 1,4-bis(3-aminopropyl)piperazine, N,N'-bis(3-aminopropyl)-1,3-propanediamine, N,N'-bis(2-aminoethyl)-1,3-propanediamine, N,N'-bis(3-aminopropyl)-1,4-butanediamine, ethylenediamine, diethylenetriamine, triethylenetetramine, tetraethylenepentamine, nitrilotrisethylamine, N,N'-(diaminoethyl)piperazine, piperazinylethylethylenediamine, aminoethyltriethylenetetramine, aminoethylpiperazinylethylethylenediamine, piperazinylethyldiethylenetriamine, pentaethylene hexamine, and mixtures thereof, and a monoamine compound of the general formula

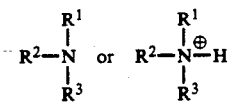

wherein $R^1$, $R^2$, and $R^3$ are independently selected from the group consisting of hydrogen, alkyl, and substituted alkyl.

11. An ink composition which comprises water, a dye, a polyamine compound, and a monoamine compound of the general formula

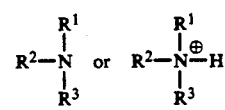

wherein $R^1$, $R^2$, and $R^3$ are independently selected from the group consisting of hydrogen, alkyl, and substituted alkyl, wherein the polyamine compound is selected from the group consisting of N,N'-bis(3-aminopropyl)-1,2-ethylenediamine, 1,4-bis(3-aminopropyl)piperazine, N,N'-bis(3-aminopropyl)-1,3-propanediamine, N,N'-bis(2-aminoethyl)-1,3-propanediamine, N,N'-bis(3-aminopropyl)-1,4-butanediamine, and mixtures thereof.

12. An ink composition which comprises water, a dye, a polyamine compound, and a monoamine compound of the general formula

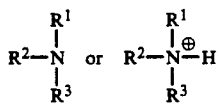

wherein $R^1$, $R^2$, and $R^3$ are independently selected from the group consisting of hydrogen, alkyl, and substituted alkyl, wherein the polyamine compound is selected from the group consisting of N,N'-bis(3-aminopropyl)-1,2-ethylenediamine, 1,4-bis(3-aminopropyl)piperazine, and mixtures thereof.

13. An ink composition which comprises water, a dye, a polyamine compound, and a monoamine compound of the general formula

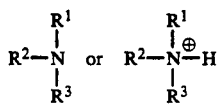

wherein $R^1$, $R^2$, and $R^3$ are independently selected from the group consisting of hydrogen, alkyl, and substituted alkyl, wherein the polyamine compound is N,N'-bis(3-aminopropyl)-1,2-ethylenediamine.

14. An ink composition according to claim 10 wherein the polyamine compound is present in an amount of from about 0.05 to about 5 percent by weight of the ink.

15. An ink composition according to claim 10 wherein the ink also contains sulfolane and a material selected from the group consisting of 2-pyrrolidinone and N-methyl pyrrolidone.

16. An ink composition according to claim 10 wherein the ink also contains a urea.

17. An ink composition according to claim 16 wherein the ink also contains a glycol.

18. An ink composition according to claim 10 wherein the dye is an anionic dye.

19. An ink composition according to claim 10 wherein the dye is selected from the group consisting of

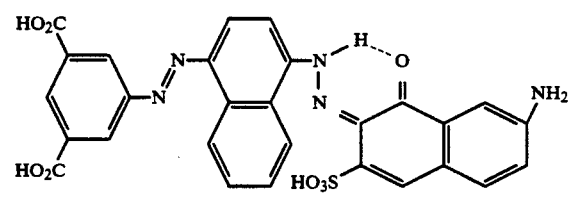

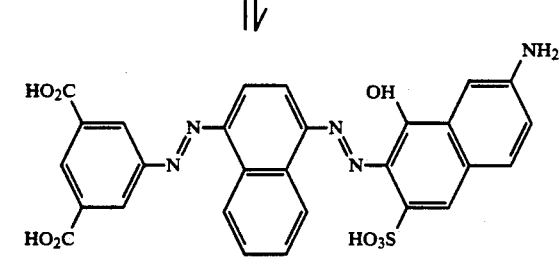

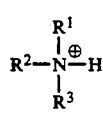

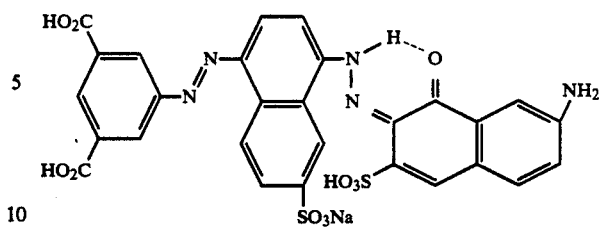

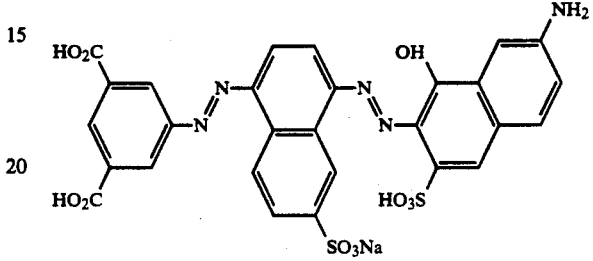

and mixtures thereof.

20. An ink composition according to claim 10 wherein the pH of the ink is from about 7 to about 10.

21. An ink composition according to claim 10 wherein the pH of the ink is more than 8 and less than 9.

22. An ink composition according to claim 10 wherein the monoamine is selected from the group consisting of ammonia, ammonium salts, methylamine, diethylamine, triethylamine, tris(hydroxymethyl) aminomethane, tris[2-(2-methoxyethoxy)ethyl]amine, taurine, 2-aminoethylphosphonic acid, 4-aminobutyric acid, 3-aminopropyl triethoxylsilane, 2-aminoethylthiol, ethanolamine, triethanolamine, and mixtures thereof.

23. An ink composition according to claim 10 wherein the monoamine is present in an amount of from about 0.05 to about 5 percent by weight of the ink.

24. An ink composition which comprises water, a dye, a first generation dendrimer compound having terminal primary amine groups, and a monoamine compound selected from the group consisting of (a) those of the general formula $$R^2-\underset{R^3}{\underset{|}{N}}-R^1$$

wherein $R^1$, $R^2$, and $R^3$ are independently selected from the group consisting of hydrogen, alkyl, and substituted alkyl wherein the substituents are selected from the group consisting of carboxylic acid, sulfonic acid, phosphonic acid, ether, and siloxy; (b) those of the general formula $$R^2-\underset{R^3}{\underset{|}{\overset{\oplus}{N}}}-H$$

wherein $R^1$, $R^2$, and $R^3$ are all hydrogen; and mixtures thereof.

25. An ink composition according to claim 24 wherein the dendrimer compound is a first generation dendrimer of ethylenediamine of the formula

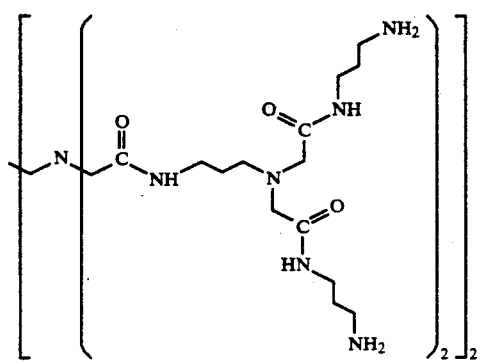

26. An ink composition according to claim 24 wherein the dendrimer compound is present in an amount of from about 0.1 to about 10 percent by weight of the ink.

27. An ink composition according to claim 24 wherein the ink also contains sulfolane and a material selected from the group consisting of 2-pyrrolidione and N-methyl pyrrolidone.

28. An ink composition according to claim 24 wherein the ink also contains a urea.

29. An ink composition according to claim 28 wherein the ink also contains a glycol.

30. An ink composition according to claim 24 wherein the dye is an anionic dye.

31. An ink composition according to claim 24 wherein the dye is selected from the group consisting of

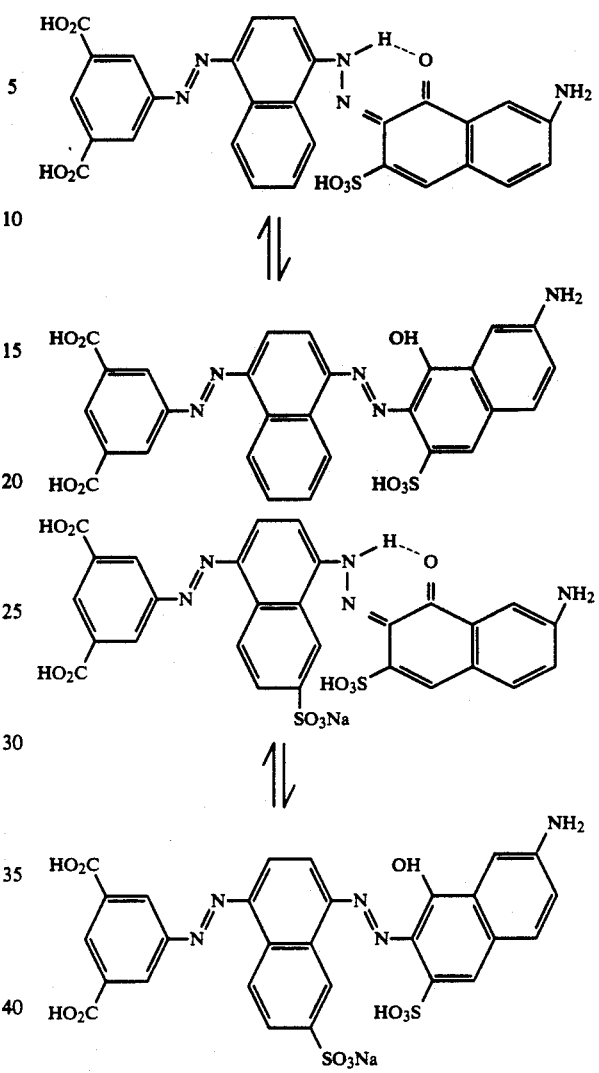

and mixtures thereof.

32. An ink composition according to claim 24 wherein the pH of the ink is from about 7 to about 10.

33. An ink composition according to claim 24 wherein the pH of the ink is more than 8 and less than 9.

34. An ink composition according to claim 24 wherein the monoamine is selected from the group consisting of ammonia, ammonium salts, methylamine, diethylamine, triethylamine, taurine, 2-aminoethylphosphonic acid, 4-aminobutyric acid, 3-aminopropyl triethoxysilane, 2-aminoethylthiol, and mixtures thereof.

35. An ink composition according to claim 24 wherein the monoamine is present in an amount of from about 0.05 to about 5 percent by weight of the ink.

* * * * *